United States Patent
Bielecki et al.

(10) Patent No.: US 10,280,965 B2
(45) Date of Patent: May 7, 2019

(54) HIGH SECURITY FASTENER WITH BUCKLED SHROUD RETAINER

(71) Applicant: McGard LLC, Orchard Park, NY (US)

(72) Inventors: Dustin D. Bielecki, Sloan, NY (US);
Daniel Tornow, Boston, NY (US);
Dillon Jones, Amherst, NY (US);
David C. Meyer, Boston, NY (US)

(73) Assignee: McGard LLC, Orchard Park, NY (US)

( * ) Notice: Subject to any disclaimer, the term of this patent is extended or adjusted under 35 U.S.C. 154(b) by 126 days.

(21) Appl. No.: 15/434,038

(22) Filed: Feb. 15, 2017

(65) Prior Publication Data

US 2017/0234356 A1 Aug. 17, 2017

Related U.S. Application Data

(60) Provisional application No. 62/295,983, filed on Feb. 16, 2016, provisional application No. 62/420,246, filed on Nov. 10, 2016.

(51) Int. Cl.
*F16B 39/02* (2006.01)
*F16B 23/00* (2006.01)
(Continued)

(52) U.S. Cl.
CPC ........ *F16B 39/025* (2013.01); *F16B 23/0007* (2013.01); *F16B 37/14* (2013.01);
(Continued)

(58) Field of Classification Search
CPC ...... F16B 23/00; F16B 23/0007; F16B 37/14; F16B 39/02; F16B 39/025; F16B 39/12; F16B 39/28; F16B 41/005
(Continued)

(56) References Cited

U.S. PATENT DOCUMENTS 1,281,709 A * 10/1918 Thomassen ............. F16B 39/12
411/222
1,459,548 A * 6/1923 Morison ................. F16B 37/14
29/508
(Continued)

FOREIGN PATENT DOCUMENTS

CN 202073902 U 12/2011
GB 1482510 A 10/1977
(Continued)

OTHER PUBLICATIONS

The International Search Report (ISR) and Written Opinion of the International Searching Authority (ISA) for International Application No. PCT/US2017/018139; Publication No. WO 2017/143040 A1; dated Mar. 30, 2017.

*Primary Examiner* — Roberta S Delisle
(74) *Attorney, Agent, or Firm* — Harter Secrest & Emery LLP

(57) ABSTRACT

An improved fastener comprising a fastener body having a tool-engaging portion, a threaded fastening portion and a shroud-receiving body portion; a shroud concentrically mounted on the shroud-receiving body portion and having an inner surface facing an outer surface of the shroud-receiving body portion; the inner surface of the shroud comprising an annular groove and the shroud-receiving body portion comprising a substantially arch-shaped axially-buckled radially-extending annular protrusion extending outwardly transverse to the central axis and disposed in the annular groove of the shroud; and the annular protrusion and annular groove of the shroud forming a shroud-retaining element restraining the shroud from movement in at least a first axial direction along the central axis such that the shroud will rotate relative to the fastener body under an applied external torque prior to the fastener body rotating (Continued)

when the fastener is engaged with an external structure at a design installation torque.

41 Claims, 16 Drawing Sheets

(51) Int. Cl.
    *F16B 37/14*     (2006.01)
    *F16B 39/12*     (2006.01)
    *F16B 39/28*     (2006.01)
    *F16B 41/00*     (2006.01)

(52) U.S. Cl.
    CPC .............. *F16B 39/02* (2013.01); *F16B 39/12* (2013.01); *F16B 39/28* (2013.01); *F16B 41/005* (2013.01)

(58) Field of Classification Search
    USPC .................................. 411/402, 429, 430, 432
    See application file for complete search history.

(56) References Cited

U.S. PATENT DOCUMENTS

| | | | | |
|---|---|---|---|---|
| 3,299,933 | A | * | 1/1967 | Akashi .................... F16B 37/14 29/511 |
| 3,431,811 | A | * | 3/1969 | Yonkers .................. F16B 37/00 411/432 |
| 3,696,646 | A | | 10/1972 | Loscalzo |
| 4,295,766 | A | * | 10/1981 | Shaw ...................... F16B 37/14 411/113 |
| 4,302,137 | A | | 11/1981 | Hart |
| 4,645,397 | A | | 2/1987 | Howe |
| RE33,114 | E | * | 11/1989 | Chiavon ............... B25B 13/485 81/121.1 |
| 5,228,250 | A | | 7/1993 | Kesselman |
| 5,454,675 | A | * | 10/1995 | DeHaitre .............. F16B 33/004 411/303 |
| 5,827,029 | A | * | 10/1998 | Denman ............... F16B 41/005 411/373 |
| 6,540,460 | B2 | * | 4/2003 | Miranda ............... F16B 31/021 411/372.5 |
| 6,935,825 | B2 | * | 8/2005 | Winker .................. F16B 37/14 411/429 |
| 7,351,020 | B1 | * | 4/2008 | Notaro ................ F16B 23/0007 411/430 |
| 7,445,414 | B1 | * | 11/2008 | Notaro ................ F16B 23/0007 411/432 |
| 8,888,430 | B2 | | 11/2014 | Groppo |
| 2003/0053886 | A1 | | 3/2003 | Ueno |
| 2011/0116891 | A1 | | 5/2011 | Notaro et al. |
| 2017/0234356 | A1 | * | 8/2017 | Bielecki ............. F16B 23/0007 411/190 |

FOREIGN PATENT DOCUMENTS

| | | |
|---|---|---|
| GB | 2179416 A | 3/1987 |
| GB | 2256821 A | 12/1992 |
| GB | 2374641 A | 10/2002 |
| GB | 2400061 A | 10/2004 |
| WO | 9702435 A1 | 7/1996 |
| WO | 0109527 A1 | 8/2001 |
| WO | 2004001237 A1 | 12/2003 |
| WO | 2015159034 A2 | 10/2015 |

\* cited by examiner

HIGH SECURITY FASTENER WITH BUCKLED SHROUD RETAINER

TECHNICAL FIELD

The present invention relates to high security fasteners, and more particularly to a high security fastener having a buckled shroud retainer.

BACKGROUND ART

Locking wheel nuts and wheel bolts are commonly used to attach wheels to axel hub assemblies of automobiles and other vehicles. These fasteners are designed with security features that are intended to thwart theft by rendering the fasteners difficult to remove with conventional tools. In particular, the fasteners do not have the usual hexagonal head pattern found on conventional nuts and bolts and instead have smooth cylindrical sidewalls that cannot be gripped by standard wrenches. Fastener removal requires the use of a special security tool having a unique key pattern that matches a corresponding groove pattern formed in the fastener end face.

Additional security can be obtained by fitting a free-spinning shroud or cap over the security fasteners cylindrical sidewalls, such that the shroud is in concentric relationship therewith. The shroud discourages the use of theft devices that could otherwise be used to grip the sidewalls and remove the fastener without an authorized security tool. Because the shroud substantially surrounds all exposed surfaces of the sidewalls, no rotational purchase can be obtained in the fastener. The theft device can only engage the shroud, which freely spins under action of the theft device while the main body of the fastener remains stationary.

Various systems have been developed for rotationally retaining the shroud or spin cap on the fastener body. For example, U.S. Pat. No. 7,445,414, entitled "High Security Fastener Constructions," is directed to a shroud fastener design having a shroud retaining system for retaining the shroud for rotation relative to the fastener body. The entire contents and disclosure of U.S. Pat. No. 7,445,414 are incorporated herein by reference. International Patent Publication No. WO2004/001237, entitled "Screw-Threaded Fastening," is directed to a wheel nut having a fastener body and a spin cap or shroud which is retained on the fastener body by means of an outwardly flared end portion of the fastener body which is received within an undercut triangular groove in the inner surface of the cap.

BRIEF SUMMARY

With parenthetical reference to corresponding parts, portions or surfaces of the disclosed embodiment, merely for the purposes of illustration and not by way of limitation, an improved fastener (15, 115, 215, 315, 415, 515, 615, 715, 815, 915) is provided comprising a fastener body (16, 116, 216, 316, 416, 516, 616, 716, 816, 916) orientated about a central axis (x-x); the fastener body having a tool-engaging portion (17, 117, 217, 317, 417, 517, 617, 717, 817, 917) to which a driving torque may be applied and a threaded fastening portion (18, 118, 218, 318, 418, 518, 618, 718, 818, 918) configured and arranged to mate with a corresponding threaded element; the fastener body having a shroud-receiving body portion (19, 119, 219, 319, 419, 519, 619, 719, 819, 919) orientated about the central axis; a shroud (20, 120, 220, 320, 420, 520, 620, 720, 820, 920) concentrically mounted on the shroud-receiving body portion and having an inner surface facing an outer surface of the shroud-receiving body portion; the shroud being supported in rotatable relationship with the shroud-receiving body portion such that the shroud will rotate relative to the fastener body under an applied external torque prior to the fastener body rotating when the fastener is engaged with an external structure at a design installation torque; the inner surface of the shroud comprising an annular groove (40, 140, 240, 340, 440, 540, 640, 740, 840, 940) orientated transverse to the central axis; the shroud-receiving body portion comprising a substantially arch-shaped axially-buckled radially-extending annular protrusion (43, 143, 243, 343, 443, 543, 643, 743, 843, 943) extending outwardly transverse to the central axis and having at least an annular apex (44, 144, 244, 344, 444, 544, 644, 744, 844, 944) disposed in the annular groove of the shroud; and the substantially arch-shaped axially-buckled radially-extending annular protrusion of the shroud-receiving body portion and the annular groove of the shroud forming a shroud-retaining element restraining the shroud from movement in at least a first axial direction along the central axis.

The shroud-receiving body may comprise a thin-walled cylindrical tubular portion having an annular first body surface (26), and an annular shoulder (17) having an annular second body surface (24); the shroud may comprise an annular shoulder portion having an annular first shroud surface (38, 138, 238, 338, 438, 535, 635, 735, 835, 935), and an annular second shroud surface (30, 130, 230, 330, 430, 530, 630, 730, 830, 930); and the first body surface may face the first shroud surface and the second body contact surface may face the second shroud surface. The second body surface (24) of the shroud-receiving body and the second shroud surface (30, 130, 230, 330, 430, 530, 630, 730, 830, 930) of the shroud may be in an opposing orientation and form a second shroud-retaining element restraining the shroud from movement in at least a second axial direction along the central axis opposite to the first axial direction along the central axis. An end portion (42) of the thin-walled cylindrical tubular portion of the shroud-receiving body that is adjacent the annular first body surface of the shroud-receiving body may be supported radially by an opposed inwardly-facing cylindrical surface (37, 137, 237, 337, 437) of the shroud such that the end portion of the thin-walled cylindrical tubular portion of the shroud-receiving body is restrained from deforming radially outwardly from the central axis by the opposed inwardly-facing cylindrical surface of the shroud. The annular groove (40, 140, 240, 340, 440) of the shroud may extend into a medial portion of the inner surface of the shroud between the first shroud surface (38, 138, 238, 338, 438) and the second shroud surface (30, 130, 230, 330, 430). The shroud-retaining element may be formed by an axial buckle of a medial portion (41) of the thin-walled cylindrical tubular portion of the shroud-receiving body radially into the annular groove (40, 140, 240, 340, 440) of the shroud. The axial buckle of the medial portion (41) of the thin-walled cylindrical tubular portion of the shroud-receiving body may be formed by a compressive force applied axially to the thin-walled cylindrical tubular portion of the shroud-receiving body by the first shroud surface (38, 138, 238, 338, 438) of the shroud. The groove (40, 140, 240, 340, 440) of the shroud may comprise an annular first inner corner, an annular second inner corner, an annular first outer edge with the inner surface of the shroud (31, 131, 231, 331, 431), and an annular second outer edge with the inner surface (37, 137, 237, 337, 437) of the shroud. The annular first inner corner and/or the annular second inner corner of the groove may comprise a frusto-conical surface (132, 136, 532, 534, 932, 934) or a radial surface (832). The annular first outer edge and/or the annular second outer edge of the groove may comprise a frusto-conical surface (32, 36, 632) or a radial surface. The annular groove of the shroud may comprise a trapezoidal (140, 540, 940), triangular (340) or semi-circular (440) cross-section taken in a plane extending radially from the central axis. The groove of the shroud may be substantially U-shaped (440) or V-shaped (340). The substantially arch-shaped axially-buckled radially-extending annular protrusion of the shroud-receiving body portion may be asymmetrical (843). The substantially arch-shaped axially-buckled radially-extending annular protrusion of the shroud-receiving body portion may be substantially U-shaped (244, 444) or V-shaped (44, 344). The fastener body may comprise a lock nut (16, 116, 216, 316, 416, 516, 616, 716, 816) or a lock bolt (916).

In another aspect a fastener (1015, 1115) is provided comprising a fastener body orientated about a central axis (x-x); the fastener body having a tool-engaging portion (1017, 1117) to which a driving torque may be applied and a threaded fastening portion (1018, 1118) configured and arranged to mate with a corresponding threaded element; the fastener body having a shroud-receiving body portion (1019, 1119) orientated about the central axis; a shroud (1020, 1120) concentrically mounted on the shroud-receiving body portion and having an inner surface (1031, 1131) facing an outer surface of the shroud-receiving body portion; the shroud being supported in rotatable relationship with the shroud-receiving body portion such that the shroud will rotate relative to the fastener body under an applied external torque prior to the fastener body rotating when the fastener is engaged with an external structure at a design installation torque; the outer surface of the shroud-receiving body portion comprising an annular groove (1040, 1140) orientated transverse to the central axis; the shroud comprising a substantially arch-shaped axially-buckled radially-extending annular protrusion (1043, 1143) extending inwardly transverse to the central axis and having at least an annular apex (1044, 1144) disposed in the annular groove of the shroud-receiving body portion; and the substantially arch-shaped axially-buckled radially-extending annular protrusion of the shroud and the annular groove of the shroud-receiving body portion forming a shroud-retaining element restraining the shroud from movement in at least a first axial direction along the central axis.

The shroud-receiving body portion may comprise an annular shoulder having an annular body surface (1024, 1124); the shroud may comprise an annular first shroud surface (1030, 1130) and an annular second shroud surface (1032, 1132); and the first shroud surface may face the body surface. The body surface of the shroud-receiving body portion and the first shroud surface of the shroud may be in an opposing orientation and form a second shroud-retaining element restraining the shroud from movement in at least a second axial direction along the central axis opposite to the first axial direction along the central axis. The end portion (1045) of the shroud that is adjacent the first shroud surface (1030) of the shroud may be supported radially by an opposed outwardly-facing cylindrical surface (1025) of the shroud-receiving body portion such that the end portion of the shroud is restrained from deforming radially inwardly toward the central axis by the opposed outwardly-facing cylindrical surface of the shroud-receiving body portion. The shroud-receiving body portion may comprise an annular second body end surface (1059) and the annular groove (1040) of the shroud-receiving body portion may extend into a medial portion of the outer surface of the shroud-receiving body portion between the body surface and the second body surface. The shroud-retaining element may be formed by an axial buckle (1044) of a medial portion of the shroud radially into the annular groove (1040) of the shroud-receiving body portion (1019). The axial buckle (1040) of the medial portion of the shroud may be formed by a compressive force applied axially to the annular second shroud surface (1032) of the shroud. The shroud may comprise a thinned tubular cylindrical portion (1041, 1145) axially aligned with the annular groove (1040, 1140) of the shroud-receiving body portion and the shroud-retaining element may be formed by an axial buckle (1043, 1143) of the thinned tubular cylindrical portion of the shroud radially into the annular groove of the shroud-receiving body portion. The thinned tubular cylindrical portion of the shroud may comprise an annular crease (1036, 1136) and the annular apex (1044, 1144) of the shroud-retaining element may be formed by an axial buckle of the thinned tubular cylindrical portion (1041, 1045) of the shroud at the annular crease radially into the annular groove (1040, 1140) of the shroud-receiving body portion. The groove of the shroud-receiving body portion may comprise an annular first inner corner, an annular second inner corner, an annular first outer edge with the outer surface of the shroud-receiving body portion, and an annular second outer edge with the outer surface of the shroud-receiving body portion. The annular first inner corner and/or the annular second inner corner of the groove may comprise a frusto-conical surface (1026, 1028, 1126, 1128) or a radial surface. The annular first outer edge and/or the annular second outer edge of the groove may comprise a frusto-conical surface or a radial surface. The annular groove of the shroud-receiving body portion may comprise a trapezoidal, triangular or semi-circular cross-section taken in a plane extending radially from the central axis. The groove of the shroud-receiving body portion may be substantially U-shaped or V-shaped. The substantially arch-shaped axially-buckled radially-extending annular protrusion of the shroud may be asymmetrical. The substantially arch-shaped axially-buckled radially-extending annular protrusion of the shroud may be substantially U-shaped or V-shaped. The fastener body may comprise a lock nut or a lock bolt.

In another aspect, a fastener (1215, 1315, 1415) is provided comprising a fastener body (1216, 1416) orientated about a central axis; the fastener body having a tool-engaging portion (1217, 1417) to which a driving torque may be applied and a threaded fastening portion (1218, 1418) configured and arranged to mate with a corresponding threaded element; the fastener body having a shroud-receiving body portion (1219, 1419) orientated about the central axis; a shroud (1220, 1320, 1420) concentrically mounted on the shroud-receiving body portion and having an inner surface facing an outer surface of the shroud-receiving body portion; the shroud being supported in rotatable relationship with the shroud-receiving body portion such that the shroud will rotate relative to the fastener body under an applied external torque prior to the fastener body rotating when the fastener is engaged with an external structure at a design installation torque; the outer surface of the shroud-receiving body portion comprising an annular step (1225, 1226, 1425, 1426) orientated transverse to the central axis; the shroud comprising an axially-buckled radially-extending annular end portion (1244, 1344, 1443, 1444) bent inwardly transverse to the central axis and disposed in the annular step of the shroud-receiving body portion; and the bent end portion of the shroud and the annular step of the shroud-receiving body portion forming a shroud-retaining element restraining the shroud from movement in at least a first axial direction along the central axis.

The shroud-receiving body portion may comprise a second annular step (1226, 1125); the shroud may comprise an annular flange (1245, 1345) disposed around the annular step of the shroud-receiving body portion; and the second annular step of the shroud-receiving body portion and the annular flange of the shroud may form a second shroud-retaining element restraining the shroud from movement in at least a second axial direction along the central axis opposite to the first axial direction along the central axis. The shroud may comprises a thinned tubular cylindrical portion (1242, 1342, 1442, 1445) axially aligned with the annular step of the shroud-receiving body portion and the shroud-retaining element may be formed by an axial buckle of the thinned tubular cylindrical portion of the shroud radially around the annular step of the shroud-receiving body portion. The thinned tubular cylindrical portion of the shroud may comprise an annular crease (1236, 1336, 1436, 1466) and the shroud-retaining element may be formed by an axial buckle of the thinned tubular cylindrical portion of the shroud at the annular crease. The shroud-receiving body portion may comprise a second annular step and the outer surface of the shroud-receiving body portion may comprise an annular notch or recess (1228, 1428) between the annular step (1225, 1425) and the second annular step (1226, 1426). The outer surface of the shroud-receiving body portion may comprise a second annular step (1425, 1426) orientated transverse to the central axis; the shroud may comprise a second axially-buckled radially-extending annular end portion (1443, 1444) bent inwardly transverse to the central axis and disposed around the second annular step of the shroud-receiving body portion; and the second bent end portion of the shroud and the second annular step of the shroud-receiving body portion may form a second shroud-retaining element restraining the shroud from movement in at least a second axial direction along the central axis opposite to the first axial direction along the central axis. The shroud may comprise a thinned tubular cylindrical portion (1442, 1445) axially aligned with the second annular step (1425, 1426) of the shroud-receiving body portion and the second shroud-retaining element may be formed by an axial buckle of the thinned tubular cylindrical portion of the shroud radially around the second annular step of the shroud-receiving body portion. The thinned tubular cylindrical portion of the shroud may comprise an annular crease (1436, 1466) and the second shroud-retaining element may be formed by an axial buckle of the thinned tubular cylindrical portion of the shroud at the annular crease. The fastener body may comprise a lock nut or a lock bolt.

In another aspect, a method of forming a fastener is provided comprising the steps of: providing a fastener body orientated about a central axis; the fastener body having a tool engaging portion to which a driving torque may be applied, a threaded fastening portion configured and arranged to mate with corresponding threaded element, and a shroud-receiving body portion orientated about the central axis; providing a shroud; mounting the shroud concentrically on the shroud-receiving body portion such that an inner surface of the shroud faces an outer surface of the shroud-receiving body portion; axially aligning an annular groove in the inner surface of the shroud or the shroud receiving body with a buckling portion of the other of the shroud or the shroud-receiving body portion; restraining the fastener body from moving in a first direction along the central axis; applying an axial force to the shroud or the shroud-receiving body in the first direction such that the buckling portion buckles inwardly or outwardly into the annular groove under the applied axial force to form a substantially arch-shaped axially-buckled radially-extending annular protrusion extending transverse to the central axis and having at least an annular apex disposed in the annular groove; such that the shroud is restrained from movement in at least one axial direction along the central axis that is opposite to the first axial direction.

DETAILED DESCRIPTION OF THE EMBODIMENTS

Figure 1:
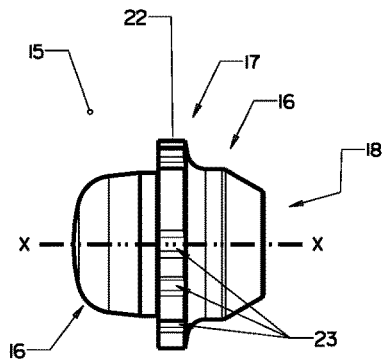
FIG. 1 is a side elevation view of a first embodiment of an improved security fastener.
Figure 2:
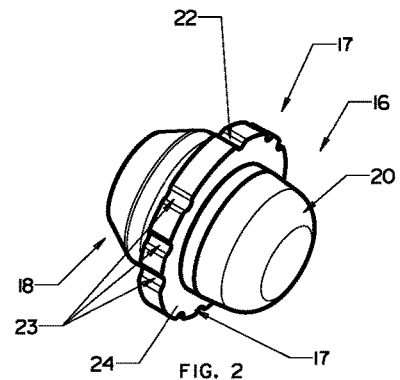
FIG. 2 is a perspective view of the security fastener shown in FIG. 1.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to FIGS. 1-6, an improved safety fastener is provided, a first nut-type embodiment of which is generally indicated at 15. Nut fastener 15 generally includes fastener body 16 and cap or shroud 20, which rotates about axis x-x relative to fastener body 16. Fastener body 16 includes tool engaging portion 17, threaded fastening portion 18 and shroud-retaining post 19 on which shroud 20 is rotationally supported.

Threaded fastening portion 18 of fastener body 16 includes bore 21 that is internally threaded over a portion or all of its length. Nut fastener 15 may be installed in a wheel having a recess hole formed as a relatively deep cylindrical well. The wheel hole has an annular recess entrance and a wheel stud or post in the wheel hole, and fastener body 16 and fastening portion 18 are sized and installed such that the interior threads of inner bore 21 engage the corresponding exterior threads of the wheel stud in the wheel hole.

Tool engaging portion 17 of fastener body 16 extends radially outward between fastening portion 18 and shroud-retaining post 19 and comprises side wall 22 that is substantially cylindrical in shape. Side wall 22 is formed with a key-receiving pattern that may be implemented as a set of circumferentially arranged lock pattern grooves 23. Lock pattern configurations that use formations of other grooves may also be used. As can be seen, lock pattern grooves 23 are visible on the annular front face 24 of tool engaging portion 17 that lies between side wall 22 and shroud 20. In order to impart lock pattern uniqueness, lock pattern grooves 23 may be patterned or configured in any suitable alternative manner, such as by employing a selected number of grooves and/or by varying other features thereof, such as the spacing between grooves and/or the width, length, depth, profile or other configuration or feature thereof. Such grooves are configured so that a corresponding key (no shown) may be used to engage lock pattern grooves 23. The key includes a socket and a drive portion and the entrance to the socket is formed with a key pattern that may be implemented as a set of circumferentially arranged key pattern lobes that are configured and arranged to engage the lock pattern grooves 23 when the socket is placed over the left end and shroud 20 of nut fastener 15. Thus, a key having a matching set of key pattern lobes may be used to engage lock pattern grooves 23 to actuate nut fastener 15 about axis x-x.

The security key is configured to fit within a gap space to engage the lock pattern and rotate nut fastener 15. Other tools either will not fit within the gap space or will not be able to properly engage and rotate nut fastener 15 when it is installed at its intended design installation torque. The size of the gap can be controlled by sizing the diameter of cylindrical sidewall 22 according to the diameter of the recess hole in which nut fastener 15 is employed. Tool engaging portion 17 is arranged so that sidewall 22 is within the wheel hole. In this position, the nut fastener's lock pattern is only exposed inside the recessed wheel hole entrance. In this position, access to the nut fastener's lock pattern is limited by the circumferential gap space between the lock pattern's outside diameter and the wheel hole's inside diameter. The ability of shroud 20 to spin relative to fastener body 16 and fastening portion 18 thereof provides a security feature that protects nut fastener 15 from being used as a purchase point for an unauthorized tools. Should an attempt be made to rotate nut fastener 15 by gripping the exposed end, cap 20 will tend to spin without any rotation being imparted to fastener body 16 and fastening portion 18 thereof.

Figure 3:
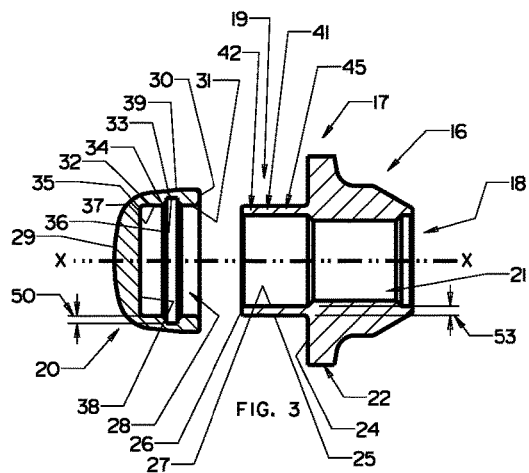
FIG. 3 is a pre-assembled exploded longitudinal vertical sectional view of the security fastener shown in FIG. 1.

Pre-assembled, as shown in FIG. 3, retaining post 19 of fastener body 16 is a specially configured cylindrical member elongated along axis x-x and is generally bounded by leftwardly-facing vertical annular surface 24, outwardly-facing horizontal cylindrical surface 25, leftwardly-facing annular vertical surface 26, and inwardly-facing horizontal cylindrical surface 27. Surfaces 25, 26 and 27 generally form a thin-walled hollow cylindrical column of inner diameter 54, outer diameter 55 and thickness 53, and comprise distal end portion 42, medial portion 41 and proximate portion 45.

Shroud 20 extends over and around shroud receiving post 19. As shown, shroud 20 includes inner bore 28, having inside diameter 56 approximately the same size as outside diameter 55 of post 19 and comprising specially configured annular groove 40. In particular, and with reference to FIG.

3, inner bore 28 of shroud 20 has a generally cylindrical configuration elongated along axis x-x and is generally bounded by rightwardly-facing vertical annular surface 30, inwardly-facing horizontal cylindrical surface 31, leftwardly and inwardly-facing frusto-conical surface 32, leftwardly-facing vertical annular surface 33, inwardly-facing horizontal cylindrical surface 34, rightwardly-facing vertical annular surface 35, rightwardly and inwardly-facing frusto-conical surface 36, inwardly-facing horizontal cylindrical surface 37, and rightwardly-facing vertical circular surface 38. Surfaces 32, 33, 34, 35 and 36 define annular groove 40 orientated transverse to axis x-x.

Figure 4:
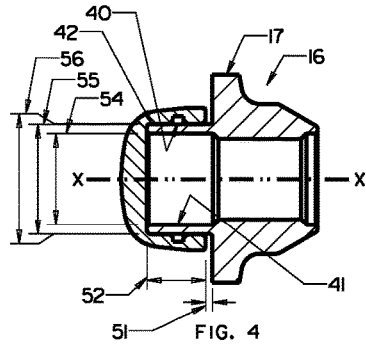
FIG. 4 is a pre-assembled longitudinal vertical sectional view of the security fastener shown in FIG. 1.

In the pre-assembled state shown in FIG. 4, shroud 20 has been placed over left distal end 42 of post 19 such that the outer annular portion of rightwardly-facing surface 38 of shroud 20 abuts against leftwardly-facing annular end face 26 of end 42 of post 19. As shown, in this pre-assembled state depth 52 of bore 28 of shroud 20 is dimensioned to provide gap 51 between rightwardly-facing annular end face 30 of shroud 20 and annular end face 24 of fastener body 16. When assembled as described below, gap 51 will disappear as medial portion 41 of post 19 buckles outwardly into groove 40 and reduces the axial length along axis x-x of post 19 from end face 24 of body 16.

Figure 5:
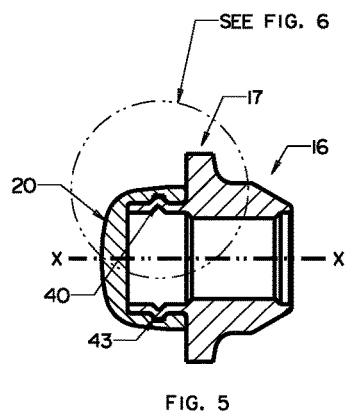
FIG. 5 is a fully-assembled longitudinal vertical sectional view of the security fastener shown in FIG. 1.
Figure 6:
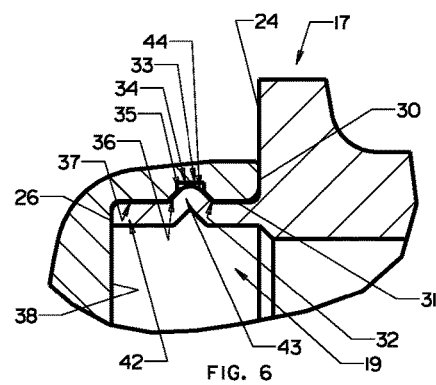
FIG. 6 is an enlarged detailed view of the security fastener shown in FIG. 5, taken generally within the indicated circle of FIG. 5.
Figure 7:
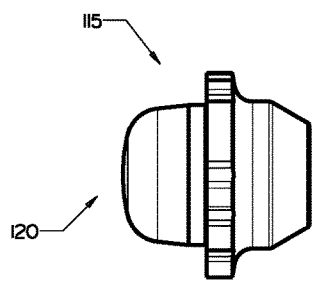
FIG. 7 is a side elevation view of a second embodiment of an improved security fastener.
Figure 8:
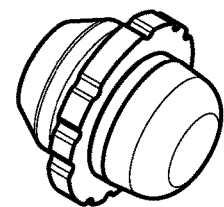
FIG. 8 is a perspective view of the security fastener shown in FIG. 7.

To complete assembly of fastener 15, with shroud 20 placed over left distal end 42 of post 19 such that the outer annular portion of rightwardly-facing surface 38 of shroud 20 abuts against leftwardly-facing annular end face 26 of end 42 of post 19 as shown in FIG. 4, an axial force is then applied with a ram to outer leftwardly-facing rounded surface 29 of shroud 20 while fastener body 16 is held stationary in a press or the like. Such force is great enough to drive end face 38 of shroud 20 into end face 26 of fastener body 16 and buckle medial portion 41 of cylindrical portion 19 into groove 40, as shown in FIGS. 5 and 6, which depict the fully assembled configuration of fastener 15. Thus, instead of deforming the cylindrical end 42 of fastener body 16 into a groove, fastener body 16 and shroud 20 are specially formed such that applying a directed axial force to shroud 20 with a ram causes cylindrical medial portion 41 to buckle outwards into specially formed groove 40 in shroud 20. Thus, distal end portion 42 and annular end face 26 of fastener post 19 are held so that they do not flare outwards. Instead, medial portion 41, which is axially inward from end face 26 of fastener body 16, buckles into groove 40. As shown, the left peripheral or distal end 42 of cylindrical post 19 of body 16 is radially supported or held in place by inwardly-facing cylindrical surface 37 of shroud 20 so that peripheral end 42 does not deform or flare out. However, medial portion 41 of cylindrical end post 19, which aligns axially with groove 40 of shroud 20, is not immediately supported and has thickness 53 designed to buckle outwardly into groove 40 under the applied force to form buckled retaining arch 43. When assembled, at least apex 44 of buckled arch 43 extends into groove 40, thereby retaining shroud 20 on the end of body 16 such that shroud 20 is free to rotate about center axis x-x of body 16 but is restrained from moving axially to the left off of end 42 of post 19 and body 16. It has been found that buckled medial portion 43 of post 19, rather than a flared end portion, results in a cap assembly that requires higher tear-off forces to remove and therefore is more secure. Thus, as shown in FIG. 6, substantially arched-shaped axially-buckled radially-extending annular protrusion 43 is formed, which extends outwardly transverse to central axis x-x and has at least an annular apex 44 disposed in annular groove 40 of shroud 20.

As shown in FIGS. 3 and 6, annular groove 40 in shroud 20 has an annular ninety degree or squared first inner corner at the junction between surfaces 33 and 34, and an annular ninety degree or squared second inner corner at the junction between surfaces 34 and 35. Annular groove 40 also has an annular first outer edge with inner surface 31 of shroud 20 defined by frusto-conical surface 32, and an annular second outer edge with inner surface 37 of shroud 20 defined by frusto-conical surface 36. Accordingly, surfaces 32 and 36 provide groove 40 with a chamfered outer edged groove, which helps to form a symmetrical arched-shaped axially-buckled radially-extending annular protrusion 43 disposed in annular groove 40 of shroud 20 when medial portion 41 of cylindrical end post 19 buckles outwardly into groove 40 under the applied axial ram force. As shown, groove 40 therefor comprises a generally square cross-sectional profile taken in a cross-sectional plane extending radially from central axis x-x with chamfered outer edges.

Shroud 20 is thereby mounted concentrically on retaining post 19 of nut fastener 15 such that it does not move axially off of retaining post 19 but is substantially free to rotate about axis x-x relative to fastener body 16. Although exterior surfaces 29 and 39 of shroud 20 are shown as being substantially rounded and cylindrical, respectively, other shapes or contours could also be used, such as hexagonal, square or entirely cylindrical. Moreover, although shroud 20 is shown as being closed ended on one side, alternatively it may have an open-ended configuration that partially exposes the end of post 19. If desired, shroud 20 may have a decorative finish to improve fastener appearance, including, but not limited to, nickel/chrome plating, silver or gray coatings.

Turning now to FIGS. 7-12, a nut-type security fastener 115 according to a second example embodiment is shown. Fastener 115 has most of the features of fastener 15 described above in connection with FIGS. 1-6. The major difference between fastener 115 and fastener 15 lies in the fact that groove 140 of shroud 120 of fastener 115 is formed with a generally trapezoidal cross-sectional profile taken in a cross-sectional plane extending radially from central axis x-x.

Figure 9:
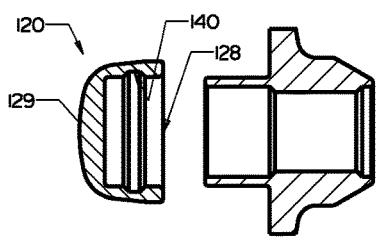
FIG. 9 is a pre-assembled exploded longitudinal vertical sectional view of the security fastener shown in FIG. 7.
Figure 11:
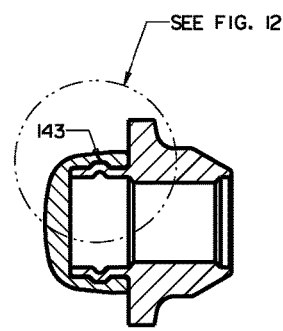
FIG. 11 is a fully-assembled longitudinal vertical sectional view of the security fastener shown in FIG. 7.

In particular, and with reference to FIGS. 9 and 11, inner bore 128 of shroud 120 has a generally cylindrical configuration elongated along axis x-x and is generally bounded by rightwardly-facing vertical annular surface 130, inwardly-facing horizontal cylindrical surface 131, leftwardly and inwardly-facing frusto-conical surface 132, inwardly-facing horizontal cylindrical surface 134, rightwardly and inwardly-facing frusto-conical surface 136, inwardly-facing horizontal cylindrical surface 137, and rightwardly-facing vertical circular surface 138. Surfaces 132, 134, and 136 define annular groove 140 orientated transverse to axis x-x.

Figure 10:
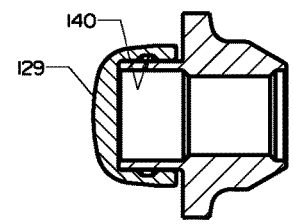
FIG. 10 is a pre-assembled longitudinal vertical sectional view of the security fastener shown in FIG. 7.
Figure 12:
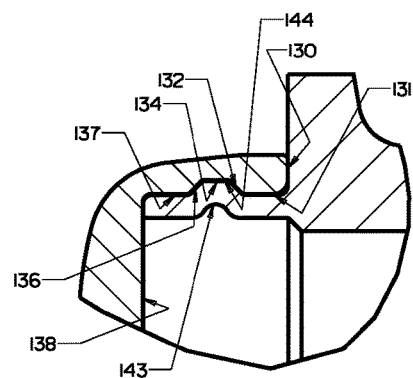
FIG. 12 is an enlarged detailed view of the security fastener shown in FIG. 11, taken generally within the indicated circle of FIG. 11.
Figure 13:
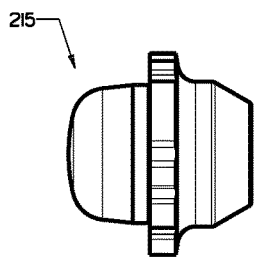
FIG. 13 is a side elevation view of a third embodiment of an improved security fastener.
Figure 14:
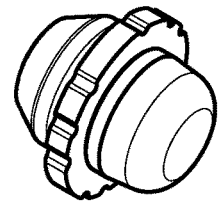
FIG. 14 is a perspective view of the security fastener shown in FIG. 13.

As shown and described with respect to fastener 15, in the pre-assembled state shown in FIG. 10, shroud 120 has been placed over left distal end 42 of post 19 such that the outer annular portion of rightwardly-facing surface 138 of shroud 120 abuts against leftwardly-facing annular end face 26 of end 42 of post 19. To complete assembly of fastener 115, with shroud 120 placed over left distal end 42 of post 19 such that the outer annular portion of rightwardly-facing surface 138 of shroud 120 abuts against leftwardly-facing annular end face 26 of end 42 of post 19 as shown in FIG. 10, an axial force is then applied with a ram to outer leftwardly-facing rounded surface 129 of shroud 120 while fastener body 16 is held stationary in a press or the like. Such force is great enough to buckle medial portion 41 of cylindrical portion 19 into groove 140, as shown in FIGS. 11 and 12, which depict the fully assembled configuration of fastener 115. Thus, medial portion 41, which is axially inward from end face 26 of fastener body 16, buckles into groove 140. As shown, the left peripheral or distal end 42 of cylindrical post 19 of body 16 is radially supported or held in place by inwardly-facing cylindrical surface 137 of shroud 120 so that peripheral end 42 does not deform or flare out. However, medial portion 41 of cylindrical end post 19, which aligns axially with groove 140 of shroud 120, is not immediately supported and has thickness 53 designed to buckle outwardly into groove 140 under the applied force to form buckled retaining arch 143. When assembled, at least apex 144 of buckled arch 143 extends into groove 140, thereby retaining shroud 120 on the end of body 16 such that shroud 120 is free to rotate about center axis x-x of body 16 but is restrained from moving axially to the left off of end 42 of post 19 and body 16. Thus, as shown in FIG. 12, substantially arched-shaped axially-buckled radially-extending annular protrusion 143 is formed, which extends outwardly transverse to central axis x-x and has at least an annular apex 144 disposed in annular groove 140 of shroud 120.

As shown in FIGS. 9 and 12, annular groove 140 in shroud 120 has an annular obtuse first inner corner at the junction between surfaces 132 and 134, and an annular obtuse second inner corner at the junction between surfaces 134 and 136. Annular groove 140 also has an annular first outer edge with inner surface 131 of shroud 120 at the junction between surfaces 131 and 132, and an annular second outer edge at the junction between surfaces surface 136 and 137 of shroud 120. Accordingly, surfaces 132 and 136 provide groove 140 with a sloped edged groove, which helps to form arched-shaped axially-buckled radially-extending annular protrusion 143 disposed in annular groove 140 of shroud 120 when medial portion 41 of cylindrical end post 19 buckles outwardly into groove 140 under the applied axial ram force. As shown, groove 140 therefor comprises a generally trapezoidal cross-sectional profile taken in a cross-sectional plane extending radially from central axis x-x.

Turning now to FIGS. 13-18, a nut-type security fastener 215 according to a third example embodiment is shown. Fastener 215 has most of the features of fastener 15 described above in connection with FIGS. 1-6. The major difference between fastener 215 and fastener 15 lies in the fact that groove 240 of shroud 220 of fastener 215 is formed with a generally rectangular cross-sectional profile taken in a cross-sectional plane extending radially from central axis x-x.

Figure 15:
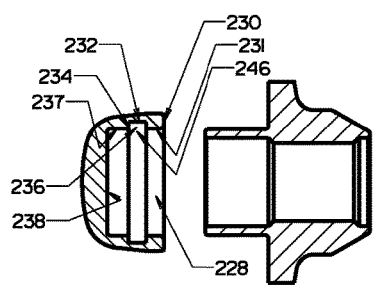
FIG. 15 is a pre-assembled exploded longitudinal vertical sectional view of the security fastener shown in FIG. 13.
Figure 18:
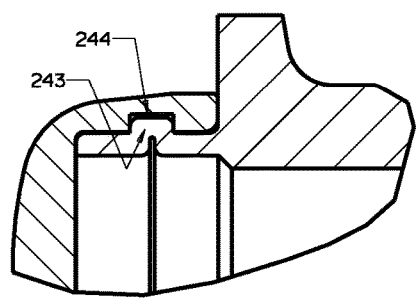
FIG. 18 is an enlarged detailed view of the security fastener shown in FIG. 17, taken generally within the indicated circle of FIG. 17.
Figure 19:
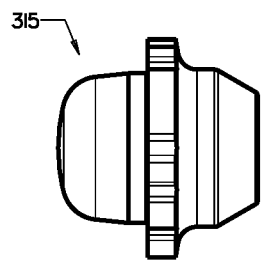
FIG. 19 is a side elevation view of a fourth embodiment of an improved security fastener.
Figure 20:
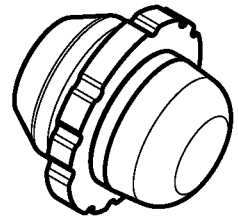
FIG. 20 is a perspective view of the security fastener shown in FIG. 19.

In particular, and with reference to FIGS. 15 and 18, inner bore 228 of shroud 220 has a generally cylindrical configuration elongated along axis x-x and is generally bounded by rightwardly-facing vertical annular surface 230, inwardly-facing horizontal cylindrical surface 231, leftwardly-facing vertical annular surface 232, inwardly-facing horizontal cylindrical surface 234, rightwardly-facing vertical annular surface 236, inwardly-facing horizontal cylindrical surface 237, and rightwardly-facing vertical circular surface 238. Surfaces 232, 234, and 236 define annular groove 240 orientated transverse to axis x-x.

Figure 16:
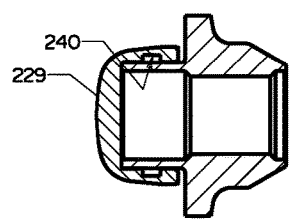
FIG. 16 is a pre-assembled longitudinal vertical sectional view of the security fastener shown in FIG. 13.
Figure 17:
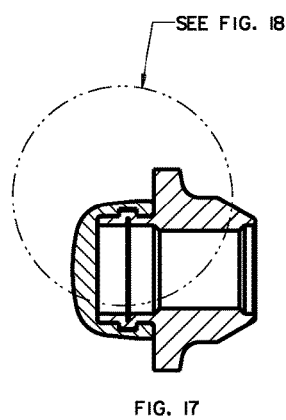
FIG. 17 is a fully-assembled longitudinal vertical sectional view of the security fastener shown in FIG. 13.

As shown and described with respect to fastener 15, in the pre-assembled state shown in FIG. 16, shroud 220 has been placed over left distal end 42 of post 19 such that the outer annular portion of rightwardly-facing surface 238 of shroud 220 abuts against leftwardly-facing annular end face 26 of end 42 of post 19. To complete assembly of fastener 215, with shroud 220 placed over left distal end 42 of post 19 such that the outer annular portion of rightwardly-facing surface 238 of shroud 220 abuts against leftwardly-facing annular end face 26 of end 42 of post 19 as shown in FIG. 16, an axial force is then applied with a ram to outer leftwardly-facing rounded surface 229 of shroud 220 while fastener body 16 is held stationary in a press or the like. Such force is great enough to buckle medial portion 41 of cylindrical portion 19 into groove 240, as shown in FIGS. 17 and 18, which depict the fully assembled configuration of fastener 215. Thus, medial portion 41, which is axially inward from end face 26 of fastener body 16, buckles into groove 240. As shown, the left peripheral or distal end 42 of cylindrical post 19 of body 16 is radially supported or held in place by inwardly-facing cylindrical surface 237 of shroud 220 so that peripheral end 42 does not deform or flare out. However, medial portion 41 of cylindrical end post 19, which aligns axially with groove 240 of shroud 220, is not immediately supported and has thickness 53 designed to buckle outwardly into groove 240 under the applied force to form buckled retaining arch 243. When assembled, at least flattened apex 244 of buckled arch 243 extends into groove 240, thereby retaining shroud 220 on the end of body 16 such that shroud 220 is free to rotate about center axis x-x of body 16 but is restrained from moving axially to the left off of end 42 of post 19 and body 16. Thus, as shown in FIG. 18, substantially arched-shaped axially-buckled radially-extending annular protrusion 243 is formed, which extends outwardly transverse to central axis x-x and has at least an annular apex 244 disposed in annular groove 240 of shroud 220. Annular apex 244 in this embodiment is flattened as shown.

As shown in FIGS. 15 and 18, annular groove 240 in shroud 220 has an annular ninety degree or squared first inner corner at the junction between surfaces 232 and 234, and an annular ninety degree or squared second inner corner at the junction between surfaces 234 and 236. Annular groove 240 also has an annular ninety degree or squared first outer edge with inner surface 231 of shroud 220 at the junction between surfaces 231 and 232, and an annular ninety degree or squared second outer edge at the junction between surfaces surface 236 and 237 of shroud 220 at the junction between surfaces 236 and 237 of shroud 220. Accordingly, surfaces 232, 234 and 236 help to form arched-shaped axially-buckled radially-extending annular protrusion 243 disposed in annular groove 240 of shroud 220 when medial portion 41 of cylindrical end post 19 buckles outwardly into groove 240 under the applied axial ram force. As shown, groove 240 therefor comprises a generally rectangular cross-sectional profile taken in a cross-sectional plane extending radially from central axis x-x.

Turning now to FIGS. 19-24, a nut-type security fastener 315 according to a fourth example embodiment is shown. Fastener 315 has most of the features of fastener 15 described above in connection with FIGS. 1-6. The major difference between fastener 315 and fastener 15 lies in the fact that groove 340 of shroud 320 of fastener 315 is formed with a generally V-shaped cross-sectional profile taken in a cross-sectional plane extending radially from central axis x-x.

Figure 21:
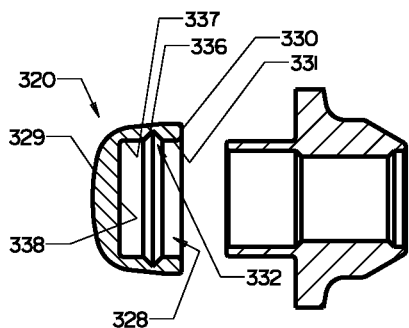
FIG. 21 is a pre-assembled exploded longitudinal vertical sectional view of the security fastener shown in FIG. 19.
Figure 24:
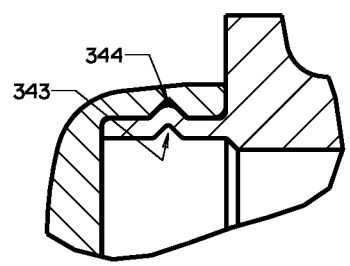
FIG. 24 is an enlarged detailed view of the security fastener shown in FIG. 23, taken generally within the indicated circle of FIG. 23.
Figure 25:
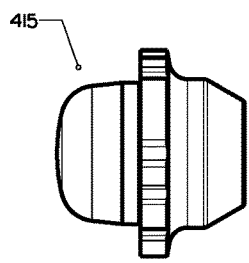
FIG. 25 is a side elevation view of a fifth embodiment of an improved security fastener.
Figure 26:
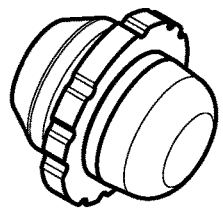
FIG. 26 is a perspective view of the security fastener shown in FIG. 25.

In particular, and with reference to FIGS. 21 and 24, inner bore 328 of shroud 320 has a generally cylindrical configuration elongated along axis x-x and is generally bounded by rightwardly-facing vertical annular surface 330, inwardly-facing horizontal cylindrical surface 331, leftwardly and inwardly-facing frusto-conical surface 332, rightwardly and inwardly-facing frusto-conical surface 336, inwardly-facing horizontal cylindrical surface 337, and rightwardly-facing vertical circular surface 338. Surfaces 332 and 336 define annular groove 340 orientated transverse to axis x-x.

Figure 22:
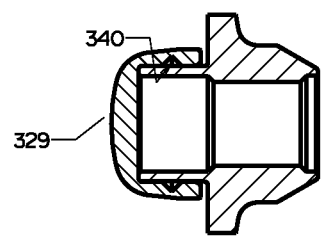
FIG. 22 is a pre-assembled longitudinal vertical sectional view of the security fastener shown in FIG. 19.
Figure 23:
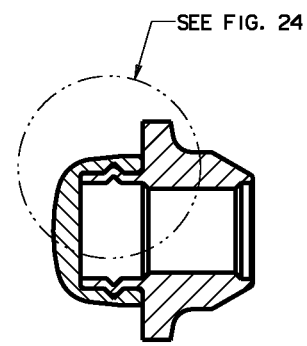
FIG. 23 is a fully-assembled longitudinal vertical sectional view of the security fastener shown in FIG. 19.

As shown and described with respect to fastener 15, in the pre-assembled state shown in FIG. 22, shroud 320 has been placed over left distal end 42 of post 19 such that the outer annular portion of rightwardly-facing surface 338 of shroud 320 abuts against leftwardly-facing annular end face 26 of end 42 of post 19. To complete assembly of fastener 315, with shroud 320 placed over left distal end 42 of post 19 such that the outer annular portion of rightwardly-facing surface 338 of shroud 320 bears against leftwardly-facing annular end face 26 of end 42 of post 19 as shown in FIG. 22, an axial force is then applied with a ram to outer leftwardly-facing rounded surface 329 of shroud 320 while fastener body 16 is held stationary in a press or the like. Such force is great enough to buckle medial portion 41 of cylindrical portion 19 into groove 340, as shown in FIGS. 23 and 24, which depict the fully assembled configuration of fastener 315. Thus, medial portion 41, which is axially inward from end face 26 of fastener body 16, buckles into groove 340. As shown, the left peripheral or distal end 42 of cylindrical post 19 of body 16 is radially supported or held in place by inwardly-facing cylindrical surface 337 of shroud 320 so that peripheral end 42 does not deform or flare out. However, medial portion 41 of cylindrical end post 19, which aligns axially with groove 340 of shroud 320, is not immediately supported and has thickness 53 designed to buckle outwardly into groove 340 under the applied force to form buckled retaining arch 343. When assembled, pointed apex 344 of buckled arch 343 extends into groove 340, thereby retaining shroud 320 on the end of body 16 such that shroud 320 is free to rotate about center axis x-x of body 16 but is restrained from moving axially to the left off of end 42 of post 19 and body 16. Thus, as shown in FIG. 24, substantially arched-shaped axially-buckled radially-extending annular protrusion 343 is formed, which extends outwardly transverse to central axis x-x and has at least an annular pointed apex 344 disposed in annular groove 340 of shroud 320. As shown, in this embodiment arched-shaped axially-buckled radially-extending annular protrusion 343 is generally V-shaped.

As shown in FIGS. 21 and 24, annular groove 340 in shroud 320 has a single annular acute inner corner at the junction between surfaces 332 and 336, and an annular first outer edge with inner surface 331 of shroud 320 at the junction between surfaces 331 and 332, and an annular second outer edge at the junction between surfaces surface 336 and 337 of shroud 320. Accordingly, surfaces 332 and 336 provide groove 340 with a sloped edged groove, which helps to form arched-shaped axially-buckled radially-extending annular protrusion 343 disposed in annular groove 340 of shroud 320 when medial portion 41 of cylindrical end post 19 buckles outwardly into groove 340 under the applied axial ram force. As shown, groove 340 therefor comprises a generally V-shaped cross-sectional profile taken in a cross-sectional plane extending radially from central axis x-x.

Turning now to FIGS. 25-30, a nut-type security fastener 415 according to a fifth example embodiment is shown. Fastener 415 has most of the features of fastener 15 described above in connection with FIGS. 1-6. The major difference between fastener 415 and fastener 15 lies in the fact that groove 440 of shroud 420 of fastener 415 is formed with a generally U-shaped cross-sectional profile taken in a cross-sectional plane extending radially from central axis x-x.

Figure 27:
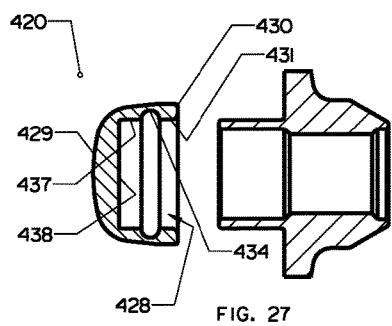
FIG. 27 is a pre-assembled exploded longitudinal vertical sectional view of the security fastener shown in FIG. 25.
Figure 30:
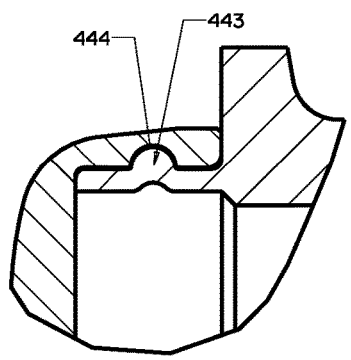
FIG. 30 is an enlarged detailed view of the security fastener shown in FIG. 29, taken generally within the indicated circle of FIG. 29.
Figure 31:
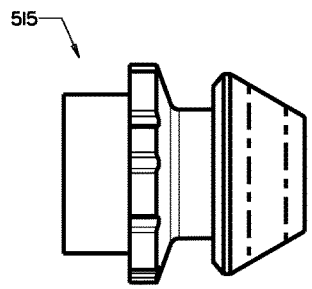
FIG. 31 is a side elevation view of a sixth embodiment of an improved security fastener.
Figure 32:
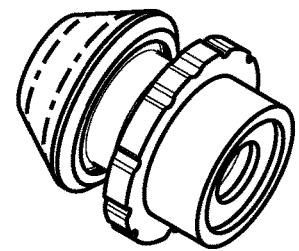
FIG. 32 is a perspective view of the security fastener shown in FIG. 31.

In particular, and with reference to FIGS. 27 and 30, inner bore 428 of shroud 420 has a generally cylindrical configuration elongated along axis x-x and is generally bounded by rightwardly-facing vertical annular surface 430, inwardly-facing horizontal cylindrical surface 431, inwardly-facing semi-circular radial surface 434, inwardly-facing horizontal cylindrical surface 437, and rightwardly-facing vertical circular surface 438. Surface 434 defines annular groove 440 orientated transverse to axis x-x.

Figure 28:
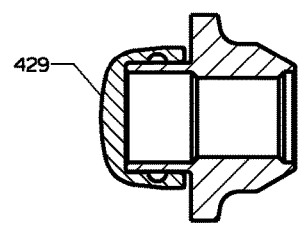
FIG. 28 is a pre-assembled longitudinal vertical sectional view of the security fastener shown in FIG. 25.
Figure 29:
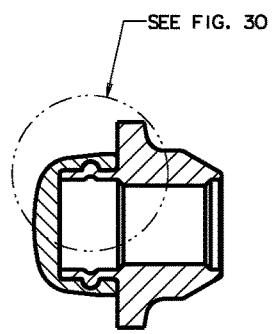
FIG. 29 is a fully-assembled longitudinal vertical sectional view of the security fastener shown in FIG. 25.

As shown and described with respect to fastener 15, in the pre-assembled state shown in FIG. 28, shroud 420 has been placed over left distal end 42 of post 19 such that the outer annular portion of rightwardly-facing surface 438 of shroud 420 abuts against leftwardly-facing annular end face 26 of end 42 of post 19. To complete assembly of fastener 415, with shroud 420 placed over left distal end 42 of post 19 such that the outer annular portion of rightwardly-facing surface 438 of shroud 420 bears against leftwardly-facing annular end face 26 of end 42 of post 19 as shown in FIG. 28, an axial force is then applied with a ram to outer leftwardly-facing rounded surface 429 of shroud 420 while fastener body 16 is held stationary in a press or the like. Such force is great enough to buckle medial portion 41 of cylindrical portion 19 into groove 440, as shown in FIGS. 29 and 30, which depict the fully assembled configuration of fastener 415. Thus, medial portion 41, which is axially inward from end face 26 of fastener body 16, buckles into groove 440. As shown, the left peripheral or distal end 42 of cylindrical post 19 of body 16 is radially supported or held in place by inwardly-facing cylindrical surface 437 of shroud 420 so that peripheral end 42 does not deform or flare out. However, medial portion 41 of cylindrical end post 19, which aligns axially with groove 440 of shroud 420, is not immediately supported and has thickness 53 designed to buckle outwardly into groove 440 under the applied force to form buckled curved retaining arch 443. When assembled, curved apex 444 of buckled arch 443 extends into groove 440, thereby retaining shroud 420 on the end of body 16 such that shroud 420 is free to rotate about center axis x-x of body 16 but is restrained from moving axially to the left off of end 42 of post 19 and body 16. Thus, as shown in FIG. 30, substantially arched-shaped axially-buckled radially-extending annular protrusion 443 is formed, which extends outwardly transverse to central axis x-x and has at least an annular curved apex 444 disposed in annular groove 440 of shroud 420. As shown, in this embodiment arched-shaped axially-buckled radially-extending annular protrusion 443 is generally U-shaped.

As shown in FIGS. 27 and 30, annular groove 440 in shroud 420 has a single annular inner radius, and an annular first outer edge with inner surface 431 of shroud 420 at the junction between surfaces 431 and 434, and an annular second outer edge at the junction between surfaces surface 434 and 437 of shroud 420. Accordingly, surface 434 provides groove 340 with a semicircular groove, which helps to form arched-shaped axially-buckled radially-extending annular protrusion 443 disposed in annular groove 440 of shroud 420 when medial portion 41 of cylindrical end post 19 buckles outwardly into groove 440 under the applied axial ram force. As shown, groove 440 therefor comprises a generally U-shaped or semi-circular cross-sectional profile taken in a cross-sectional plane extending radially from central axis x-x.

Turning now to FIGS. 31-36, a nut-type security fastener 515 according to a sixth example embodiment is shown. Fastener 515 has most of the features of fastener 115 described above in connection with FIGS. 7-12. The major difference between fastener 515 and fastener 115 lies in the fact that shroud 520 of fastener 515 is not entirely closed ended and annular groove 540 is aligned with end portion 542 of post 519.

Figure 33:
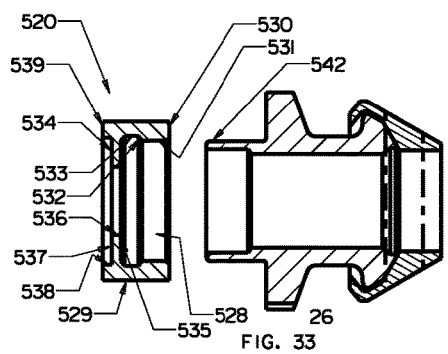
FIG. 33 is a pre-assembled exploded longitudinal vertical sectional view of the security fastener shown in FIG. 31.
Figure 36:
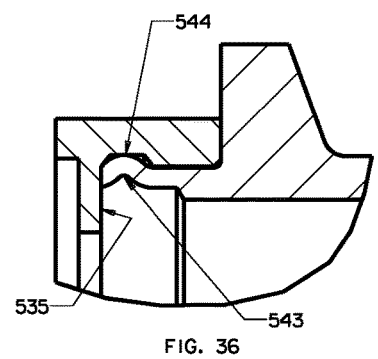
FIG. 36 is an enlarged detailed view of the security fastener shown in FIG. 35, taken generally within the indicated circle of FIG. 35.
Figure 37:
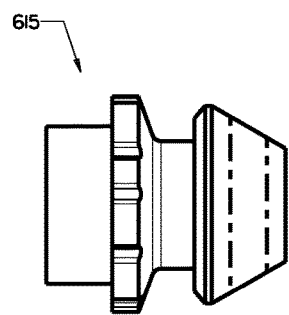
FIG. 37 is a side elevation view of a seventh embodiment of an improved security fastener.
Figure 38:
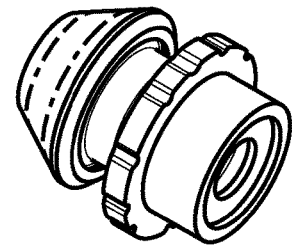
FIG. 38 is a perspective view of the security fastener shown in FIG. 37.

In particular, and with reference to FIGS. 33 and 36, shroud 520 has a generally cylindrical configuration elongated along axis x-x and is generally bounded by outwardly-facing horizontal cylindrical surface 529, rightwardly-facing vertical annular surface 530, inwardly-facing horizontal cylindrical surface 531, leftwardly and inwardly-facing frusto-conical surface 532, inwardly-facing horizontal cylindrical surface 533, rightwardly and inwardly-facing frusto-conical surface 534, rightwardly-facing vertical annular surface 535, inwardly-facing horizontal cylindrical surface 536, leftwardly-facing vertical annular surface 537, inwardly-facing horizontal cylindrical surface 538, and leftwardly-facing vertical annular surface 539, joined on it outs marginal end to the left marginal end of surface 529. Through-bore 528 of shroud 520 extends axially through both sides of shroud 520 and is defined by surfaces 531-538. Surfaces 532, 533, and 534 define annular groove 540 orientated transverse to axis x-x.

Figure 34:
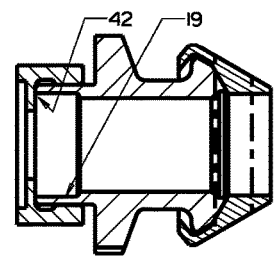
FIG. 34 is a pre-assembled longitudinal vertical sectional view of the security fastener shown in FIG. 31.
Figure 35:
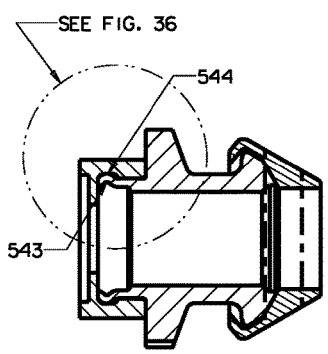
FIG. 35 is a fully-assembled longitudinal vertical sectional view of the security fastener shown in FIG. 31.

As shown and described with respect to fastener 115, in the pre-assembled state shown in FIG. 34, shroud 520 has been placed over left distal end 42 of post 19 such that the outer annular portion of rightwardly-facing annular face 535 of shroud 520 abuts against leftwardly-facing annular end face 26 of end 42 of post 19. To complete assembly of fastener 515, with shroud 520 placed over left distal end 42 of post 19 such that the outer annular portion of rightwardly-facing annular face 535 of shroud 520 abuts against and contacts leftwardly-facing annular end face 26 of end 42 of post 19 as shown in FIG. 34, an axial force is then applied with a ram to leftwardly-facing vertical annular surface 539 of shroud 520 while fastener body 16 is held stationary in a press or the like. Such force is great enough to buckle end portion 42 of cylindrical portion 19 into groove 540, as shown in FIGS. 35 and 36, which depict the fully assembled configuration of fastener 515. As shown, leftwardly-facing annular end face 26 of post 19 is radially supported by frictional contact with rightwardly-facing annular face 535 of shroud 520 so that leftwardly-facing annular end face 26 of peripheral end 42 does not flare out. However, that portion of cylindrical end post 19 that aligns axially with groove 540 of shroud 520, is not immediately supported and has thickness 53 designed to buckle outwardly into groove 540 under the applied force to form buckled retaining arch 543. When assembled, at least apex 544 of buckled arch 543 extends into groove 540, thereby retaining shroud 520 on the end of body 16 such that shroud 520 is free to rotate about center axis x-x of body 16 but is restrained from moving axially to the left off of end 42 of post 19 and body 16. Thus, as shown in FIG. 36, substantially arched-shaped axially-buckled radially-extending annular protrusion 543 is formed, which extends outwardly transverse to central axis x-x and has at least an annular apex 544 disposed in annular groove 540 of shroud 520.

As shown in FIGS. 33 and 36, annular groove 540 in shroud 520 has an annular obtuse first inner corner at the junction between surfaces 532 and 533, and an annular obtuse second inner corner at the junction between surfaces 533 and 534. Annular groove 540 also has an annular first outer edge with inner surface 531 of shroud 520 at the junction between surfaces 531 and 532, and an annular second outer edge at the junction between surfaces surface 534 and 535 of shroud 120. Accordingly, surfaces 532 and 534 provide groove 540 with a sloped edged groove, which helps to form arched-shaped axially-buckled radially-extending annular protrusion 543 disposed in annular groove 540 of shroud 520 when end portion 42 of cylindrical end post 19 buckles outwardly into groove 540 under the applied axial ram force. As shown, groove 540 therefor comprises a generally trapezoidal cross-sectional profile taken in a cross-sectional plane extending radially from central axis x-x.

Turning now to FIGS. 37-42, a nut-type security fastener 615 according to a seventh example embodiment is shown. Fastener 615 has most of the features of fastener 515 described above in connection with FIGS. 31-36. The major difference between fastener 615 and fastener 515 lies in the fact that annular groove 640 is formed with a generally polygonal cross-sectional profile taken in a cross-sectional plane extending radially from central axis x-x with a chamfered outer edge.

Figure 39:
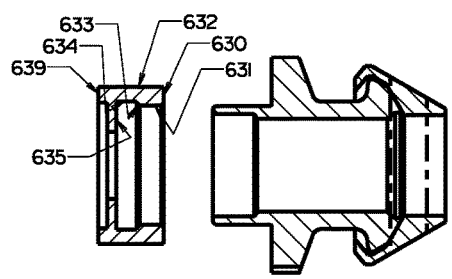
FIG. 39 is a pre-assembled exploded longitudinal vertical sectional view of the security fastener shown in FIG. 37.
Figure 42:
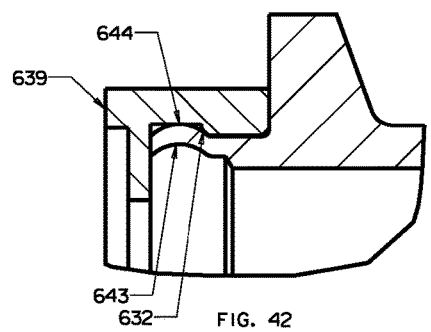
FIG. 42 is an enlarged detailed view of the security fastener shown in FIG. 41, taken generally within the indicated circle of FIG. 41.
Figure 43:
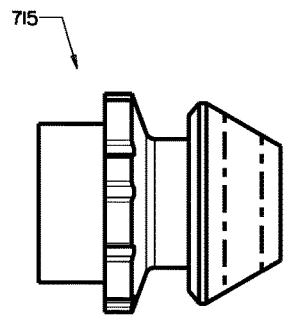
FIG. 43 is a side elevation view of a eighth embodiment of an improved security fastener.
Figure 44:
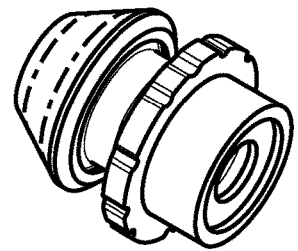
FIG. 44 is a perspective view of the security fastener shown in FIG. 43.

In particular, and with reference to FIGS. 39 and 42, shroud 620 has a generally cylindrical configuration elongated along axis x-x and is generally bounded by outwardly-facing horizontal cylindrical surface 629, rightwardly-facing vertical annular surface 630, inwardly-facing horizontal cylindrical surface 631, leftwardly and inwardly-facing frusto-conical surface 632, leftwardly-facing vertical annular surface 633, inwardly-facing horizontal cylindrical surface 634, rightwardly-facing vertical annular surface 635, inwardly-facing horizontal cylindrical surface 636, leftwardly-facing vertical annular surface 637, inwardly-facing horizontal cylindrical surface 638, and leftwardly-facing vertical annular surface 639, joined on it outs marginal end to the left marginal end of surface 629. Surfaces 632, 633, 634 and the outer annular portion of surface 635 define annular groove 640 orientated transverse to axis x-x.

Figure 40:
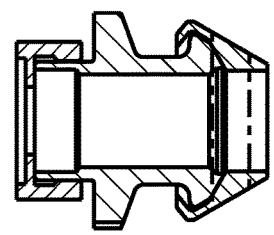
FIG. 40 is a pre-assembled longitudinal vertical sectional view of the security fastener shown in FIG. 37.
Figure 41:
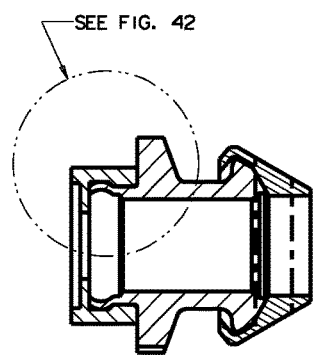
FIG. 41 is a fully-assembled longitudinal vertical sectional view of the security fastener shown in FIG. 37.

As shown and described with respect to fastener 515, in the pre-assembled state shown in FIG. 40, shroud 620 has been placed over left distal end 42 of post 19 such that the outer annular portion of rightwardly-facing annular face 635 of shroud 620 abuts against leftwardly-facing annular end face 26 of end 42 of post 19. To complete assembly of fastener 615, with shroud 620 placed over left distal end 42 of post 19 such that the outer annular portion of rightwardly-facing annular face 635 of shroud 620 abuts against and contacts leftwardly-facing annular end face 26 of end 42 of post 19 as shown in FIG. 40, an axial force is then applied with a ram to leftwardly-facing vertical annular surface 639 of shroud 620 while fastener body 16 is held stationary in a press or the like. Such force is great enough to buckle end portion 42 of cylindrical portion 19 into groove 640, as shown in FIGS. 41 and 42, which depict the fully assembled configuration of fastener 615. As shown, leftwardly-facing annular end face 26 of post 19 is radially supported by frictional contact with rightwardly-facing annular face 635 of shroud 620 so that leftwardly-facing annular end face 26 of peripheral end 42 does not flare out. However, that portion of cylindrical end post 19 that aligns axially with groove 640 of shroud 620, is not immediately supported and has thickness 53 designed to buckle outwardly into groove 640 under the applied force to form buckled retaining arch 643. When assembled, at least apex 644 of buckled arch 643 extends into groove 640, thereby retaining shroud 620 on the end of body 16 such that shroud 620 is free to rotate about center axis x-x of body 16 but is restrained from moving axially to the left off of end 42 of post 19 and body 16. Thus, as shown in FIG. 42, substantially arched-shaped axially-buckled radially-extending annular protrusion 643 is formed, which extends outwardly transverse to central axis x-x and has at least an annular apex 644 disposed in annular groove 640 of shroud 620.

As shown in FIGS. 39 and 42, annular groove 640 has an annular ninety degree or squared first inner corner at the junction between surfaces 633 and 634, and an annular ninety degree or squared second inner corner at the junction between surfaces 634 and 635. Annular groove 640 also has an annular first outer edge with inner surface 631 of shroud 620 defined by frusto-conical surface 632. Accordingly, surface 632 provides groove 640 with a sloped edged groove, which helps to form arched-shaped axially-buckled radially-extending annular protrusion 643 disposed in annular groove 640 of shroud 620 when end portion 42 of cylindrical end post 19 buckles outwardly into groove 640 under the applied axial ram force. As shown, groove 640 therefor comprises a generally polygonal cross-sectional profile taken in a cross-sectional plane extending radially from central axis x-x with a chamfered outer edge.

Turning now to FIGS. 43-48, a nut-type security fastener 715 according to an eighth example embodiment is shown. Fastener 715 has most of the features of fastener 515 described above in connection with FIGS. 31-36. The major difference between fastener 715 and fastener 515 lies in the fact that annular groove 740 is formed with a generally rectangular cross-sectional profile taken in a cross-sectional plane extending radially from central axis x-x.

Figure 45:
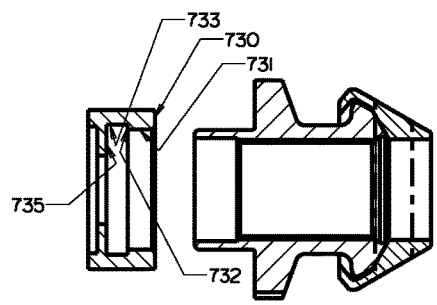
FIG. 45 is a pre-assembled exploded longitudinal vertical sectional view of the security fastener shown in FIG. 43.
Figure 48:
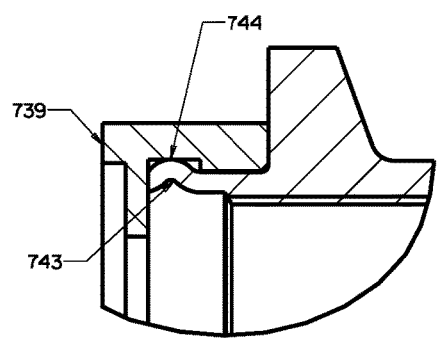
FIG. 48 is an enlarged detailed view of the security fastener shown in FIG. 47, taken generally within the indicated circle of FIG. 47.

In particular, and with reference to FIGS. 45 and 48, shroud 720 has a generally cylindrical configuration elongated along axis x-x and is generally bounded by outwardly-facing horizontal cylindrical surface 729, rightwardly-facing vertical annular surface 730, inwardly-facing horizontal cylindrical surface 731, leftwardly-facing vertical annular surface 732, inwardly-facing horizontal cylindrical surface 733, rightwardly-facing vertical annular surface 735, inwardly-facing horizontal cylindrical surface 736, leftwardly-facing vertical annular surface 737, inwardly-facing horizontal cylindrical surface 738, and leftwardly-facing vertical annular surface 739, joined on it outs marginal end to the left marginal end of surface 729. Surfaces 732, 733 and the outer annular portion of surface 735 define annular groove 740 orientated transverse to axis x-x.

Figure 46:
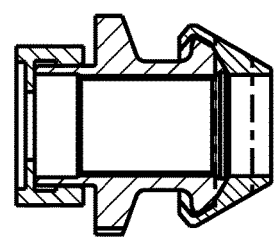
FIG. 46 is a pre-assembled longitudinal vertical sectional view of the security fastener shown in FIG. 43.
Figure 47:
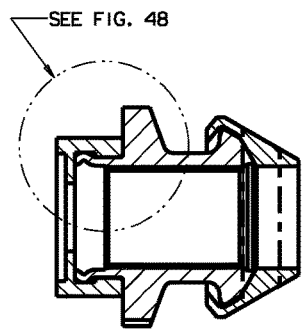
FIG. 47 is a fully-assembled longitudinal vertical sectional view of the security fastener shown in FIG. 43.

As shown and described with respect to fastener 515, in the pre-assembled state shown in FIG. 46, shroud 720 has been placed over left distal end 42 of post 19 such that the outer annular portion of rightwardly-facing annular face 735 of shroud 720 abuts against leftwardly-facing annular end face 26 of end 42 of post 19. To complete assembly of fastener 715, with shroud 720 placed over left distal end 42 of post 19 such that the outer annular portion of rightwardly-facing annular face 735 of shroud 720 abuts against and contacts leftwardly-facing annular end face 26 of end 42 of post 19 as shown in FIG. 46, an axial force is then applied with a ram to leftwardly-facing vertical annular surface 739 of shroud 720 while fastener body 16 is held stationary in a press or the like. Such force is great enough to buckle end portion 42 of cylindrical portion 19 into groove 740, as shown in FIGS. 47 and 48, which depict the fully assembled configuration of fastener 715. As shown, leftwardly-facing annular end face 26 of post 19 is radially supported by frictional contact with rightwardly-facing annular face 735 of shroud 720 so that leftwardly-facing annular end face 26 of peripheral end 42 does not flare out. However, that portion of cylindrical end post 19 that aligns axially with groove 740 of shroud 720, is not immediately supported and has thickness 53 designed to buckle outwardly into groove 740 under the applied force to form buckled retaining arch 743. When assembled, at least apex 744 of buckled arch 743 extends into groove 740, thereby retaining shroud 720 on the end of body 16 such that shroud 720 is free to rotate about center axis x-x of body 16 but is restrained from moving axially to the left off of end 42 of post 19 and body 16. Thus, as shown in FIG. 48, substantially arched-shaped axially-buckled radially-extending annular protrusion 743 is formed, which extends outwardly transverse to central axis x-x and has at least an annular apex 744 disposed in annular groove 740 of shroud 720.

As shown in FIGS. 45 and 48, annular groove 740 has an annular ninety degree or squared first inner corner at the junction between surfaces 732 and 733, and an annular ninety degree or squared second inner corner at the junction between surfaces 733 and 735. Annular groove 740 also has an annular ninety degree or squared first outer edge with inner surface 731 of shroud 720 at the junction between surfaces 731 and 732. Accordingly, arched-shaped axially-buckled radially-extending annular protrusion 743 is disposed in annular groove 740 of shroud 720 when end portion 42 of cylindrical end post 19 buckles outwardly into groove 740 under the applied axial ram force. As shown, groove 740 therefor comprises a generally rectangular cross-sectional profile taken in a cross-sectional plane extending radially from central axis x-x.

Figure 49:
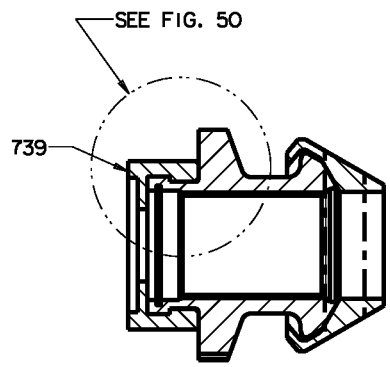
FIG. 49 is a longitudinal vertical sectional view of the security fastener shown in FIG. 43.
Figure 50:
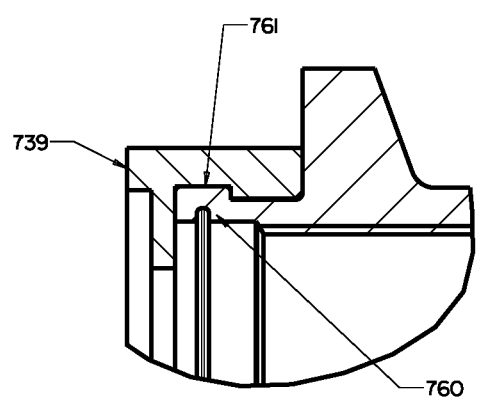
FIG. 50 is an enlarged detailed view of the security fastener shown in FIG. 49, taken generally within the indicated circle of FIG. 49.
Figure 51:
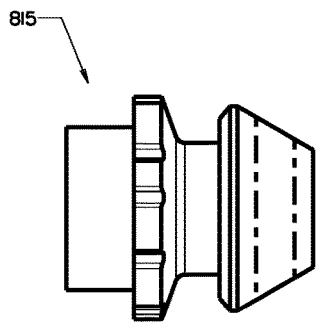
FIG. 51 is a side elevation view of a ninth embodiment of an improved security fastener.
Figure 52:
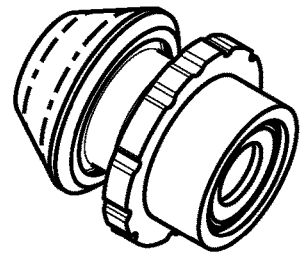
FIG. 52 is a perspective view of the security fastener shown in FIG. 51.

While the previous embodiments have described forming a substantially arched-shaped axially-buckled radially-extending annular protrusion which extends outwardly transverse to central axis x-x and has at least an annular apex disposed in an annular groove of the shroud by applying a single axial force with a ram to the exposed end of the shroud while the fastener body is held stationary in a press or the like, more than a single axial ramming force may be applied. FIGS. 49 and 50 show fastener 715 formed after applying a second axial force with a ram to the exposed end surface 739 of shroud 720 while fastener body 16 is held stationary. Such force is great enough to further buckle end portion 42 of cylindrical portion 19 into groove 740, as shown in FIGS. 49 and 50, such that arched-shaped axially-buckled radially-extending annular protrusion 760 has a flattened apex 761 and substantially fills rectangular groove 740.

Turning now to FIGS. 51-56, a nut-type security fastener 815 according to a ninth example embodiment is shown. Fastener 815 has most of the features of fastener 615 described above in connection with FIGS. 37-42. The major difference between fastener 815 and fastener 615 lies in the fact that annular groove 840 has a cross-sectional profile taken in a cross-sectional plane extending radially from central axis x-x that has a corner with a curved radius.

Figure 53:
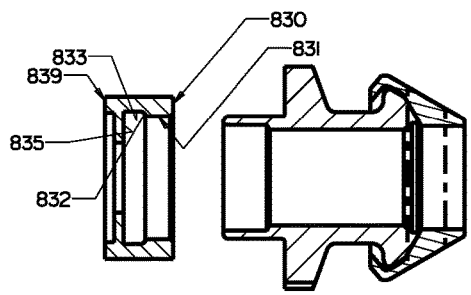
FIG. 53 is a pre-assembled exploded longitudinal vertical sectional view of the security fastener shown in FIG. 51.
Figure 56:
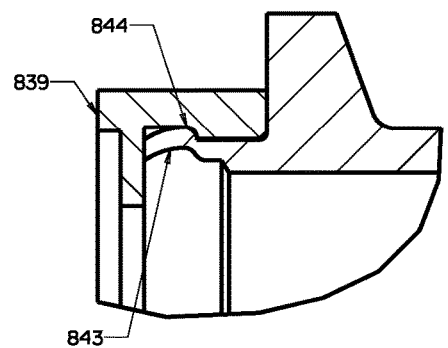
FIG. 56 is an enlarged detailed view of the security fastener shown in FIG. 55, taken generally within the indicated circle of FIG. 55.
Figure 57:
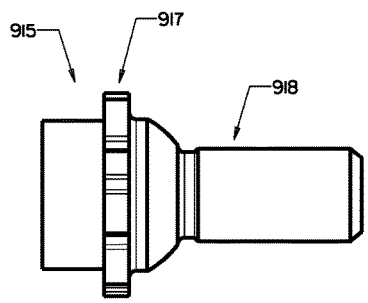
FIG. 57 is a side elevation view of a tenth embodiment of an improved security fastener.
Figure 58:
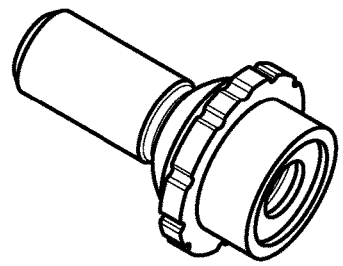
FIG. 58 is a perspective view of the security fastener shown in FIG. 57.
Figure 59:
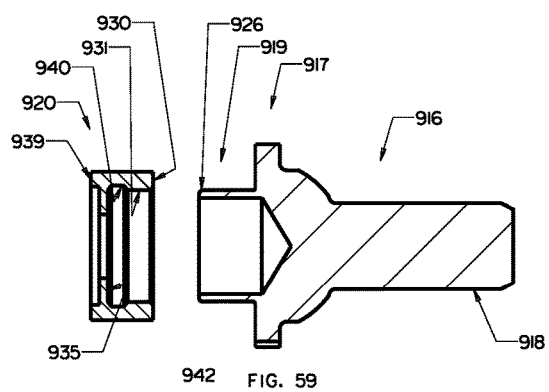
FIG. 59 is a pre-assembled exploded longitudinal vertical sectional view of the security fastener shown in FIG. 57.

In particular, and with reference to FIGS. 53 and 56, shroud 820 has a generally cylindrical configuration elongated along axis x-x and is generally bounded by outwardly-facing horizontal cylindrical surface 829, rightwardly-facing vertical annular surface 830, inwardly-facing horizontal cylindrical surface 831, leftwardly and inwardly-facing arcuate surface 832, inwardly-facing horizontal cylindrical surface 833, rightwardly-facing vertical annular surface 835, inwardly-facing horizontal cylindrical surface 836, leftwardly-facing vertical annular surface 837, inwardly-facing horizontal cylindrical surface 838, and leftwardly-facing vertical annular surface 839, joined on it outs marginal end to the left marginal end of surface 829. Surfaces 832, 833 and the outer annular portion of surface 835 define annular groove 840 orientated transverse to axis x-x.

Figure 54:
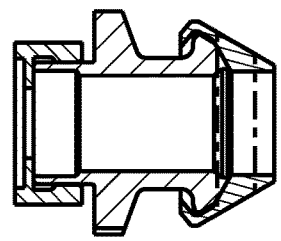
FIG. 54 is a pre-assembled longitudinal vertical sectional view of the security fastener shown in FIG. 51.
Figure 55:
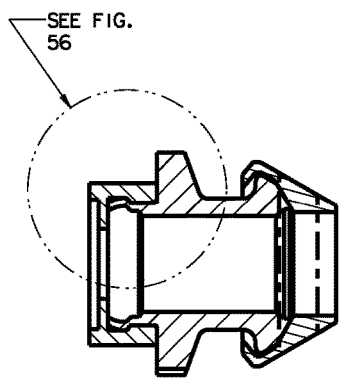
FIG. 55 is a fully-assembled longitudinal vertical sectional view of the security fastener shown in FIG. 51.

As shown and described with respect to fastener 615, in the pre-assembled state shown in FIG. 54, shroud 820 has been placed over left distal end 42 of post 19 such that the outer annular portion of rightwardly-facing annular face 835 of shroud 820 abuts against leftwardly-facing annular end face 26 of end 42 of post 19. To complete assembly of fastener 815, with shroud 820 placed over left distal end 42 of post 19 such that the outer annular portion of rightwardly-facing annular face 835 of shroud 820 abuts against and contacts leftwardly-facing annular end face 26 of end 42 of post 19 as shown in FIG. 54, an axial force is then applied with a ram to leftwardly-facing vertical annular surface 839 of shroud 820 while fastener body 16 is held stationary in a press or the like. Such force is great enough to buckle end portion 42 of cylindrical portion 19 into groove 840, as shown in FIGS. 55 and 56, which depict the fully assembled configuration of fastener 815. As shown, leftwardly-facing annular end face 26 of post 19 is radially supported by frictional contact with rightwardly-facing annular face 835 of shroud 820 so that leftwardly-facing annular end face 26 of peripheral end 42 does not flare out. However, that portion of cylindrical end post 19 that aligns axially with groove 840 of shroud 820, is not immediately supported and has thickness 53 designed to buckle outwardly into groove 840 under the applied force to form asymmetrical buckled retaining arch 843. When assembled, at least offset apex 844 of eccentric buckled arch 843 extends into groove 840, thereby retaining shroud 820 on the end of body 16 such that shroud 820 is free to rotate about center axis x-x of body 16 but is restrained from moving axially to the left off of end 42 of post 19 and body 16. Thus, as shown in FIG. 56, substantially arched-shaped axially-buckled radially-extending annular protrusion 843 is formed, which in this embodiment is not symmetrical about apex 844 and which extends outwardly transverse to central axis x-x and has at least annular apex 844 disposed in annular groove 840 of shroud 820.

As shown in FIGS. 53 and 56, annular groove 840 has an annular curved first inner radius corner defined by surface 832, and an annular ninety degree or squared second inner corner at the junction between surfaces 833 and 835. Annular groove 840 also has an annular first outer edge with inner surface 831 of shroud 820 at the junction between surfaces 831 and 832. Accordingly, surface 832 provides groove 840 with a curved cornered groove, which helps to form asymmetrically arched-shaped axially-buckled radially-extending annular protrusion 843 disposed in annular groove 840 of shroud 820 when end portion 42 of cylindrical end post 19 buckles outwardly into groove 840 under the applied axial ram force. As shown, groove 840 therefor comprises a cross-sectional profile taken in a cross-sectional plane extending radially from central axis x-x with a corner having a curved radius.

Referring now to FIGS. 57-62, an improved safety fastener is provided, a bolt-type embodiment of which is generally indicated at 915. Bolt fastener 915 generally includes fastener body 916 and shroud 920, which rotates about axis x-x relative to fastener body 916. Fastener body 916 includes tool engaging portion 917, threaded shank 918 and shroud-retaining post 919 on which shroud 920 is rotationally supported. Fastener 915 has most of the features of fastener 515 described above in connection with FIGS. 31-36. The major difference between fastener 615 and fastener 515 lies in the fact that fastening portion 918 of fastener 919 is a bolt-type fastener rather than nut type 519. Bolt fastener 915 is installed in a wheel hole such that post 919 and shroud 920 are arranged to be exposed outside the entrance of the hole. The fastening end portion 918 of bolt fastener 915 includes a shank that is externally threaded over a portion or all of its length. The bolt fastener is mounted on wheels that have at least one fastener-receiving recess hole with threads corresponding to the threads of shank 918.

Figure 60:
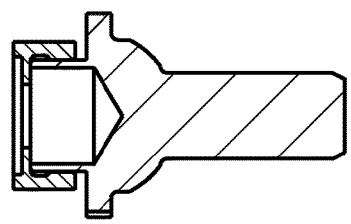
FIG. 60 is a pre-assembled longitudinal vertical sectional view of the security fastener shown in FIG. 57.
Figure 61:
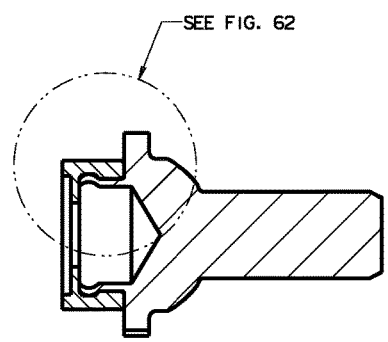
FIG. 61 is a fully-assembled longitudinal vertical sectional view of the security fastener shown in FIG. 57.
Figure 62:
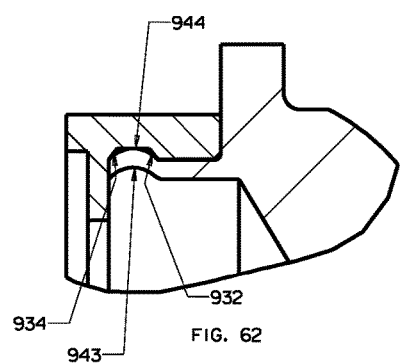
FIG. 62 is an enlarged detailed view of the security fastener shown in FIG. 61, taken generally within the indicated circle of FIG. 61.
Figure 63:
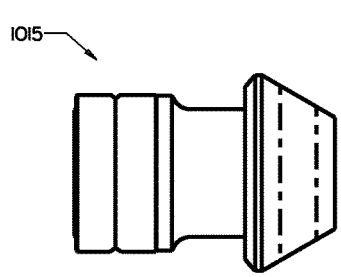
FIG. 63 is a side elevation view of an eleventh embodiment of an improved security fastener.
Figure 64:
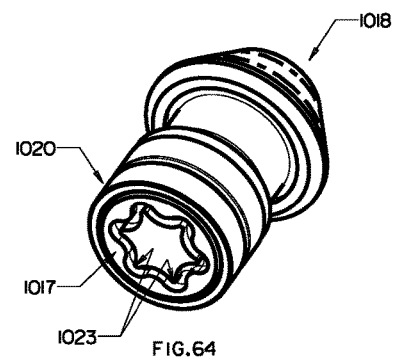
FIG. 64 is a perspective view of the security fastener shown in FIG. 63.

Post 919 is of the same configuration as post 519 and shroud 920 is of the same configuration as shroud 520. Thus, with shroud 920 placed over left distal end 942 of post 919 such that the outer annular portion of rightwardly-facing annular face 935 of shroud 920 abuts against and contacts leftwardly-facing annular end face 926 of end 942 of post 919 as shown in FIG. 60, an axial force is then applied with a ram to leftwardly-facing vertical annular surface 939 of shroud 920 while fastener body 916 is held stationary in a press or the like. Such force is great enough to buckle end portion 942 of cylindrical portion 919 into groove 940, as shown in FIGS. 61 and 62, which depict the fully assembled configuration of fastener 615. As shown, leftwardly-facing annular end face 926 of post 919 is radially supported by frictional contact with rightwardly-facing annular face 935 of shroud 920 so that leftwardly-facing annular end face 926 of peripheral end 942 does not flare out. However, that portion of cylindrical end post 919 that aligns axially with groove 940 of shroud 920, is not immediately supported and has thickness designed to buckle outwardly into groove 940 under the applied force to form buckled retaining arch 943. When assembled, at least apex 944 of buckled arch 943 extends into groove 940, thereby retaining shroud 920 on the end of body 916 such that shroud 920 is free to rotate about center axis x-x of body 916 but is restrained from moving axially to the left off of end 942 of post 919 and body 916. Thus, as shown in FIG. 62, substantially arched-shaped axially-buckled radially-extending annular protrusion 943 is formed, which extends outwardly transverse to central axis x-x and has at least an annular apex 944 disposed in annular groove 940 of shroud 920. As shown, groove 940 comprises a generally trapezoidal cross-sectional profile taken in a cross-sectional plane extending radially from central axis x-x.

Turning now to FIGS. 63-69, an improved safety fastener is provided, an inverted nut-type embodiment of which is generally indicated at 1015. Fastener 1015 generally includes fastener body 1016 and shroud 1020, which rotates about axis x-x relative to fastener body 1016. Fastener body 1016 includes tool engaging portion 1017, threaded fastening portion 1018 and shroud-retaining portion 1019 on which shroud 1020 is rotationally supported.

Threaded fastening portion 1018 of fastener body 1016 includes bore 1021 that is internally threaded over a portion or all of its length. Nut fastener 1015 may be installed in a wheel having a recess hole formed as a relatively deep cylindrical well. The wheel hole has an annular recess entrance and a wheel stud or post in the wheel hole, and fastener body 1016 and fastening portion 1018 are sized and installed such that the interior threads of inner bore 1021 engage the corresponding exterior threads of the wheel stud in the wheel hole.

Tool engaging portion 1017 of fastener body 1016 is a specially configured recess in end face 1059 having key-receiving pattern 1023 to which a drive torque may be applied. In FIGS. 63-69, lock pattern 1023 is generally in the form of a star-shaped recess. In order to impart lock pattern uniqueness, the lock pattern 1023 may be patterned in any suitable manner, such as by employing a different recess contour, a selected number of grooves and/or by varying the spacing, width, length or depth of the recess or grooves.

A key (not shown) may be used to engage lock pattern recess 1023. The key includes a socket that is formed with a key pattern configured and arranged to be received in and engage lock pattern 1023 when the socket is properly aligned and placed into tool engaging recess 1017.

Figure 65:
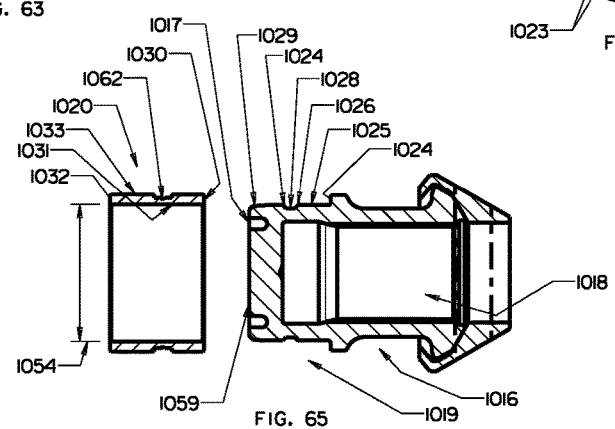
FIG. 65 is a pre-assembled exploded longitudinal vertical sectional view of the security fastener shown in FIG. 63.

As shown in FIG. 65, retaining portion 1019 of fastener body 1016 is a specially configured generally cylindrical surface elongated along axis x-x and is generally bounded by leftwardly-facing vertical annular surface 1024, outwardly-facing horizontal cylindrical surface 1025, leftwardly and outwardly-facing frusto-conical surface 1026, outwardly-facing horizontal cylindrical surface 1027, rightwardly and outwardly-facing frusto-conical surface 1028, and outwardly-facing horizontal cylindrical surface 1029. Surfaces 1026, 1027 and 1028 define annular groove 1040 orientated transverse to axis x-x.

Shroud 1020 extends over and around shroud receiving portion 1019 of fastener body 1016. As shown, pre-assembled shroud 1020 includes inner bore 1060, having an inside diameter 1054 approximately the same size as the outside diameter of surfaces 1025 and 1029 of shroud receiving portion 1019. With reference to FIG. 65, shroud 1020 has a generally cylindrical configuration elongated along axis x-x and is generally bounded by rightwardly-facing vertical annular surface 1030, inwardly-facing horizontal cylindrical surface 1031, leftwardly-facing vertical annular surface 1032, outwardly-facing horizontal cylindrical surface 1033, rightwardly-facing vertical annular surface 1034, outwardly-facing horizontal cylindrical surface 1035, rightwardly and outwardly-facing frusto-conical surface 1036a, leftwardly and outwardly-facing frusto-conical surface 1036b, outwardly-facing horizontal cylindrical surface 1037, leftwardly-facing vertical annular surface 1038, and outwardly-facing horizontal cylindrical surface 1039, joined at its right end to the outer marginal end of surface 1030. Surfaces 1020-1039 generally form a thin-walled hollow cylindrical column of inner diameter 1054 and outer diameter 1055. Shroud 1020 comprise distal end portion 1042, thinned medial portion 1041 and proximate end portion 1045. End portions 1042 and 1045 have a thickness 1053. However, groove 1062, defined by surfaces 1034-1038, has been formed in medial portion 1041 such that medial portion 1041 is thinner than end portions 1042 and 1045 and has a reduced thickness 1057. Thus, surfaces 1034-1038 define an annular rectangular groove 1062 cut into the middle of the outer cylindrical surface 1033 and 1039 of shroud 1020 and having a center V-shaped notch 1036 defined by surfaces 1036a and 1036b. This allows for buckling of thinned medial portion 1041 at notch 1036 in groove 1062 of shroud 1020 into corresponding groove 1040 of fastener body 1016.

Figure 66:
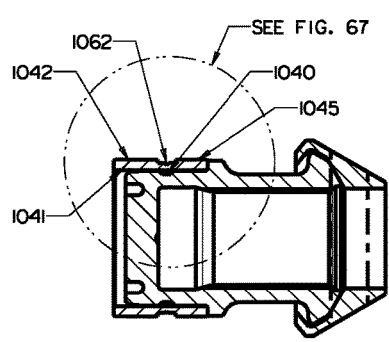
FIG. 66 is a pre-assembled longitudinal vertical sectional view of the security fastener shown in FIG. 63.
Figure 67:
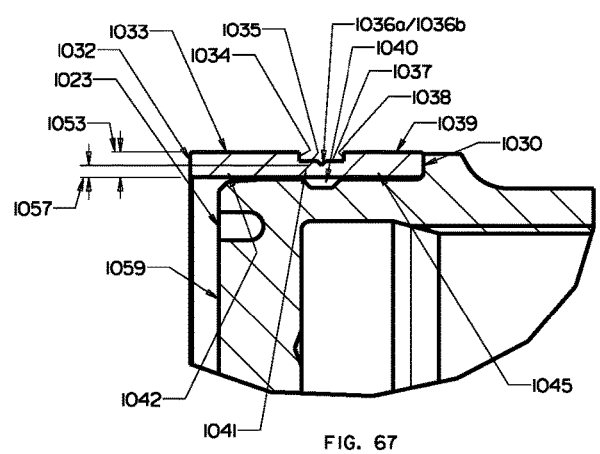
FIG. 67 is an enlarged detailed view of the security fastener shown in FIG. 66, taken generally within the indicated circle of FIG. 66.

In the pre-assembled state shown in FIGS. 66 and 67, shroud 1020 has been placed over the left end of retaining portion 1019 such that rightwardly-facing surface 1030 of shroud 1020 abuts against leftwardly-facing annular end face 1024 of retaining portion 1019. As shown, in this pre-assembled state, the left end of shroud 1020 extends leftwardly a distance beyond end face 1059 of retaining portion 1019. When assembled as described below, this extension will disappear as medial portion 1041 of shroud 1020 buckles inwardly into groove 1040 and reduces the axial length along axis x-x of shroud 1020 from end face 1024 of body 1016.

Figure 68:
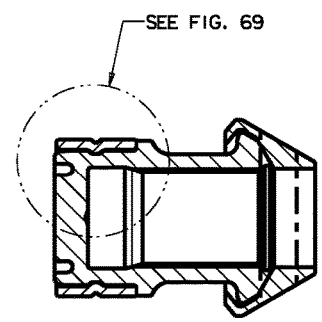
FIG. 68 is a fully-assembled longitudinal vertical sectional view of the security fastener shown in FIG. 63.
Figure 69:
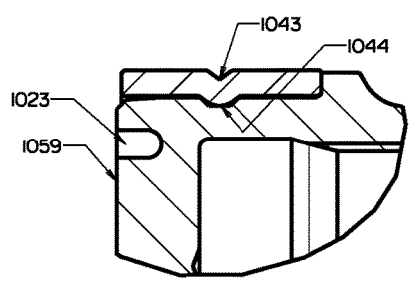
FIG. 69 is an enlarged detailed view of the security fastener shown in FIG. 68, taken generally within the indicated circle of FIG. 68.
Figure 70:
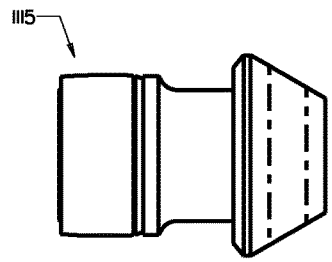
FIG. 70 is a side elevation view of an twelfth embodiment of an improved security fastener.
Figure 71:
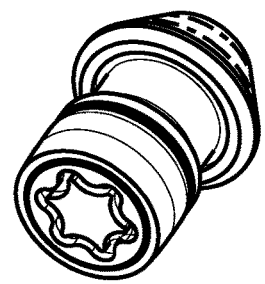
FIG. 71 is a perspective view of the security fastener shown in FIG. 70.

To complete assembly of fastener 1015, with shroud 1020 placed over left distal end of retaining portion 1019 such that rightwardly-facing surface 1030 of shroud 1020 abuts against leftwardly-facing annular end face 1024 of fastener body 1016 as shown in FIGS. 66 and 67, an axial force is then applied with a ram to leftwardly-facing annular surface 1032 of shroud 1020 while fastener body 1016 is held stationary in a press or the like. Such force is great enough to buckle medial portion 1041 at notch 1036 of shroud 1020 into groove 1040 of retaining portion 1019 of fastener body 1016, as shown in FIGS. 68 and 69, which depict the fully assembled configuration of fastener 1015. Thus, fastener body 1016 and shroud 1020 are specially formed such that applying a directed axial force to shroud 1020 with a ram causes cylindrical medial portion 1041 of shroud 1020 to buckle inwards into specially formed groove 1040 in retaining portion 1019 of body 1016. Thus, groove 1061 with interior notch 1036 form a thinned medial portion 1041 of cylindrical shroud 1020 which aligns axially with groove 1040 of retaining portion 1019 and is not immediately supported and has thickness 1057 designed to buckle inwardly into groove 1040 at notch 1036 under the applied force to form buckled retaining arch 1043. When assembled, at least apex 1044 of buckled arch 1043 extends into groove 1040, thereby retaining shroud 1020 on the end of body 1016 such that shroud 1020 is free to rotate about center axis x-x of body 1016 but is restrained from moving axially to the left off of the end of retaining portion 1019 and body 1016. It has been found that buckled medial portion 1043 of shroud 1020 results in a cap assembly that requires higher tear-off forces to remove and therefore is more secure. Thus, as shown in FIG. 69, substantially arched-shaped axially-buckled radially-extending annular protrusion 1043 is formed, which extends inwardly transverse to central axis x-x and has at least an annular apex 1044 disposed in annular groove 1040 of retaining portion 1019 of fastener body 1016.

As shown in FIGS. 67 and 68, annular groove 1040 in retaining portion 1019 has an annular obtuse first inner corner at the junction between surfaces 1026 and 1027, and an annular obtuse second inner corner at the junction between surfaces 1027 and 1028. Annular groove 1040 also has an annular first outer edge with outer surface of retaining portion 1019 at the junction between surfaces 1025 and 1926, and an annular second outer edge at the junction between surfaces surface 1029 and 1028 of retaining portion 1019. Accordingly, surfaces 1026 and 1028 provide groove 1040 with a sloped edged groove, which helps to form arched-shaped axially-buckled radially-extending annular protrusion 1043 disposed in annular groove 1040 of retaining portion 1019 when medial portion 1041 of shroud 1020 buckles inwardly into groove 1040 under the applied axial ram force. As shown, groove 1040 therefor comprises a generally trapezoidal cross-sectional profile taken in a cross-sectional plane extending radially from central axis x-x.

Shroud 1020 is thereby mounted concentrically on retaining portion 1019 of nut fastener 1015 such that it does not move axially off of retaining portion 1019 but is substantially free to rotate about axis x-x relative to fastener body 1016.

Turning now to FIGS. 70-76, a nut-type security fastener 1115 according to a twelfth example embodiment is shown. Fastener 1115 has most of the features of fastener 1015 described above in connection with FIGS. 63-69. The major difference between fastener 1115 and fastener 1015 lies in the fact that annular groove 1140 in fastener body 1016 is to the right and aligned with end portion 1145 of shroud 1120 and groove 1161 is on the right end of shroud 1120 rather than in the medial portion thereof and thereby forms a step.

In particular, retaining portion 1119 of fastener body 1116 is a specially configured generally cylindrical surface elongated along axis x-x and is generally bounded by leftwardly-facing vertical annular surface 1224, leftwardly and outwardly-facing frusto-conical surface 1126, outwardly-facing horizontal cylindrical surface 1127, rightwardly and outwardly-facing frusto-conical surface 1128, and outwardly-facing horizontal cylindrical surface 1129. Surfaces 1126, 1127 and 1128 define annular groove 1140 orientated transverse to axis x-x.

Figure 72:
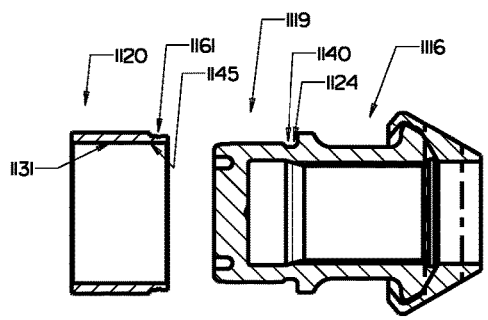
FIG. 72 is a pre-assembled exploded longitudinal vertical sectional view of the security fastener shown in FIG. 70.
Figure 74:
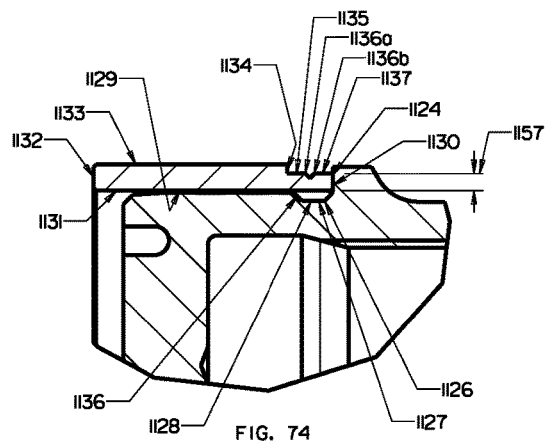
FIG. 74 is an enlarged detailed view of the security fastener shown in FIG. 73, taken generally within the indicated circle of FIG. 73.

With reference to FIGS. 72 and 74, shroud 1120 has a generally cylindrical configuration elongated along axis x-x and is generally bounded by rightwardly-facing vertical annular surface 1130, inwardly-facing horizontal cylindrical surface 1131, leftwardly-facing vertical annular surface 1132, outwardly-facing horizontal cylindrical surface 1133, rightwardly-facing vertical annular surface 1134, outwardly-facing horizontal cylindrical surface 1135, rightwardly and outwardly-facing frusto-conical surface 1136*a*, leftwardly and outwardly-facing frusto-conical surface 1136*b*, and outwardly-facing horizontal cylindrical surface 1037, joined at its right end to the outer marginal end of surface 1130. Step 1161, defined by surfaces 1034-1037, has been formed in right end portion 1145 such that end portion 1145 is thinner than the rest of shroud 1120 and has a reduced thickness 1157. Thus, surfaces 1034-1037 define an annular rectangular step 1061 cut from the right outer edge of the outer cylindrical surface 1133 of shroud 1120 and having a center V-shaped notch 1136 defined by surfaces 1136*a* and 1136*b*. This allows for buckling of thinned portion 1145 at notch 1136 in groove or step 1161 of shroud 1120 into corresponding groove 1140 of fastener body 1116.

Figure 73:
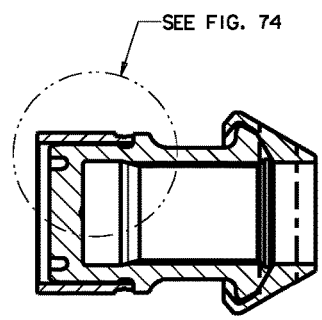
FIG. 73 is a pre-assembled longitudinal vertical sectional view of the security fastener shown in FIG. 70.
Figure 75:
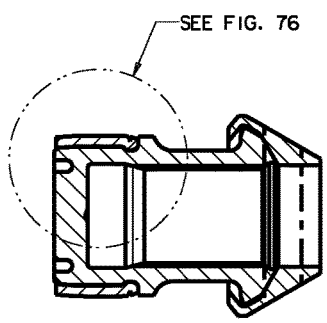
FIG. 75 is a fully-assembled longitudinal vertical sectional view of the security fastener shown in FIG. 70.
Figure 76:
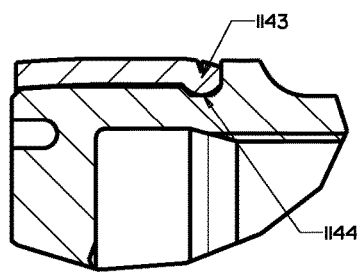
FIG. 76 is an enlarged detailed view of the security fastener shown in FIG. 75, taken generally within the indicated circle of FIG. 75.
Figure 77:
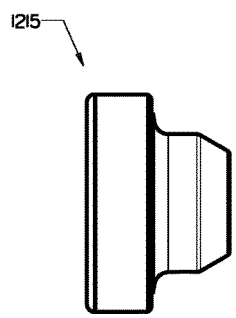
FIG. 77 is a side elevation view of an thirteenth embodiment of an improved security fastener.
Figure 78:
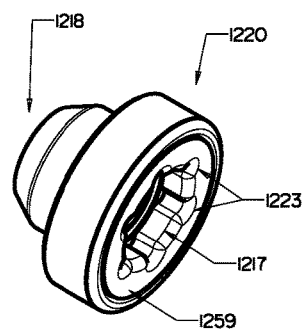
FIG. 78 is a perspective view of the security fastener shown in FIG. 77.

As shown and described with respect to fastener 1015, in the pre-assembled state shown in FIGS. 73 and 74, shroud 1120 has been placed over the left end of retaining portion 1119 such that rightwardly-facing surface 1130 of shroud 1120 abuts against leftwardly-facing annular end face 1124 of retaining portion 1119. To complete assembly of fastener 1115, with shroud 1120 placed over left distal end of retaining portion 1119 such that rightwardly-facing surface 1130 of shroud 1120 abuts against leftwardly-facing annular end face 1124 of fastener body 1116 as shown in FIGS. 73 and 74, an axial force is then applied with a ram to leftwardly-facing annular surface 1132 of shroud 1120 while fastener body 1116 is held stationary in a press or the like. Such force drives end face 1130 of shroud 1120 into end face 1124 of fastener body 1116 and is great enough to buckle tinned end portion 1145 at notch 1136 of shroud 1120 into groove 1140 of retaining portion 1119 of fastener body 1116, as shown in FIGS. 75 and 76, which depict the fully assembled configuration of fastener 1115. Thus, fastener body 1116 and shroud 1120 are specially formed such that applying a directed axial force to shroud 1120 with a ram causes cylindrical thinned end portion 1145 of shroud 1120 to buckle inwards into specially formed groove 1140 in retaining portion 1119 of body 1116. Thus, groove 1161 with interior notch 1136 form a thinned end portion of cylindrical shroud 1120 which aligns axially with groove 1140 of retaining portion 1119 and is not immediately supported and has thickness 1157 designed to buckle inwardly into groove 1140 at notch 1136 under the applied force to form buckled retaining arch 1143. When assembled, at least apex 1144 of buckled arch 1143 extends into groove 1140, thereby retaining shroud 1120 on the end of body 1116 such that shroud 1120 is free to rotate about center axis x-x of body 1116 but is restrained from moving axially to the left off of the end of retaining portion 1119 and body 1116. Thus, as shown in FIG. 76, substantially arched-shaped axially-buckled radially-extending annular protrusion 1143 is formed, which extends inwardly transverse to central axis x-x and has at least an annular apex 1144 disposed in annular groove 1140 of retaining portion 1119 of fastener body 1116.

As shown in FIGS. 75 and 76, annular groove 1140 in retaining portion 1119 has an annular obtuse first inner corner at the junction between surfaces 1126 and 1127, and an annular obtuse second inner corner at the junction between surfaces 1127 and 1128. Annular groove 1140 also has an annular first outer edge with outer surface of retaining portion 1119 at the junction between surfaces 1129 and 1128 of retaining portion 1119. Accordingly, surfaces 1126 and 1128 provide groove 1140 with a sloped edged groove, which helps together with step 1161 and notch 1136 to form arched-shaped axially-buckled radially-extending annular protrusion 1143 disposed in annular groove 1140 of retaining portion 1119 when thinned portion 1145 of shroud 1120 buckles inwardly into groove 1140 under the applied axial ram force.

Turning now to FIGS. 77-83, an improved safety fastener is provided, an inverted nut-type embodiment of which is generally indicated at 1215. Fastener 1215 generally includes fastener body 1216 and shroud 1220, which rotates about axis x-x relative to fastener body 1216. Fastener body 1216 includes tool engaging portion 1217, threaded fastening portion 1218 and shroud-retaining portion 1219 on which shroud 1220 is rotationally supported.

Threaded fastening portion 1218 of fastener body 1216 includes bore 1221 that is internally threaded over a portion or all of its length. Nut fastener 1215 may be installed in a wheel having a recess hole formed as a relatively deep cylindrical well. The wheel hole has an annular recess entrance and a wheel stud or post in the wheel hole, and fastener body 1216 and fastening portion 1218 are sized and installed such that the interior threads of inner bore 1221 engage the corresponding exterior threads of the wheel stud in the wheel hole.

Tool engaging portion 1217 of fastener body 1016 is a cavity in end face 1259 having a specially configured internal profile to which a drive torque may be applied. This internal profile comprises a key-receiving pattern that may be implemented as a set of circumferentially spaced internally facing longitudinally extending key-receiving grooves 1223 arranged in a lock pattern to which a drive torque may be applied. In order to impart lock pattern uniqueness, the grooves 1223 may be patterned in any suitable manner, such as by employing a selected number of grooves and/or by varying the spacing, width, length or depth of the grooves. A key (not shown) may be used to engage lock pattern grooves 1223. The key includes a socket that is formed with a key pattern configured and arranged to be received in and engage lock pattern grooves 1223 when the socket is properly aligned and placed into tool engaging recess 1217.

Figure 79:
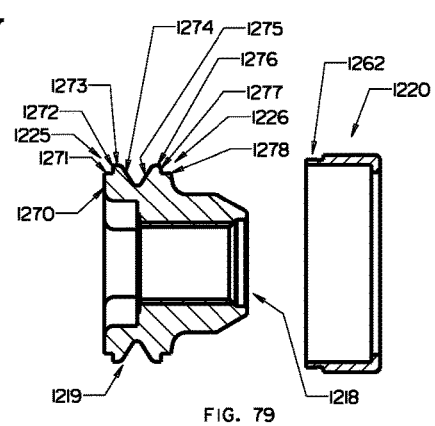
FIG. 79 is a pre-assembled exploded longitudinal vertical sectional view of the security fastener shown in FIG. 77.

As shown in FIG. 79, retaining portion 1219 of fastener body 1216 is a specially configured generally cylindrical surface elongated along axis x-x and is generally bounded by leftwardly-facing vertical annular surface 1270, outwardly-facing horizontal cylindrical surface 1271, leftwardly-facing vertical annular surface 1272, outwardly-facing horizontal cylindrical surface 1273, rightwardly and outwardly-facing frusto-conical surface 1274, leftwardly and outwardly-facing frusto-conical surface 1275, outwardly-facing horizontal cylindrical surface 1276, rightwardly-facing vertical annular surface 1277, and outwardly-facing horizontal cylindrical surface 1278. Surfaces 1271 and 1272 define left annular step 1225 orientated transverse to axis x-x and surfaces 1277 and 1278 define right annular step 1226 orientated transverse to axis x-x. Surfaces 1274 and 1275 define annular recess 1228 orientated transverse to axis x-x. Recess 1228 in body 1216 reduces the weight and material needed to form body 1216 and reduces frictional contact that might limit rotational movement of shroud 1220 about body 1216.

Figure 81:
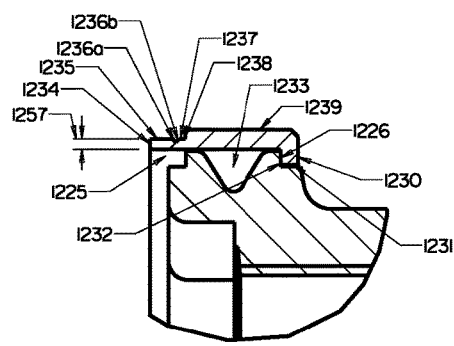
FIG. 81 is an enlarged detailed view of the security fastener shown in FIG. 80, taken generally within the indicated circle of FIG. 80.

Shroud 1220 extends over and around shroud receiving portion 1219 of fastener body 1216. With reference to FIG. 81, pre-assembled shroud 1220 has a generally cylindrical configuration elongated along axis x-x and is generally bounded by rightwardly-facing vertical annular surface 1230, inwardly-facing horizontal cylindrical surface 1231, leftwardly-facing vertical annular surface 1232, inwardly-facing horizontal cylindrical surface 1233, leftwardly-facing vertical annular surface 1234, outwardly-facing horizontal cylindrical surface 1235, rightwardly and outwardly-facing frusto-conical surface 1236*a*, leftwardly and outwardly-facing frusto-conical surface 1236*b*, outwardly-facing horizontal cylindrical surface 1237, leftwardly-facing vertical annular surface 1238, and outwardly-facing horizontal cylindrical surface 1239, joined at its right end to the outer marginal end of surface 1230. The inner annular portion of surface 1230 and surfaces 1231 and 1232 form right annular flange 1245. Step 1262, defined by surfaces 1032-1037, has been formed in right end portion 1242 such that end portion 1242 is thinner than the rest of shroud 1220 and has a reduced thickness 1257. Thus, surfaces 1035-1037 define an annular rectangular step 1262 cut from the left outer edge of the outer cylindrical surface 1239 of shroud 1220 and having a center V-shaped notch 1236 defined by surfaces 1236*a* and 1236*b*. This allows for bending and buckling of thinned portion 1245 at notch 1236 in step 1262 of shroud 1220 into corresponding step 1225 of fastener body 1216.

Figure 80:
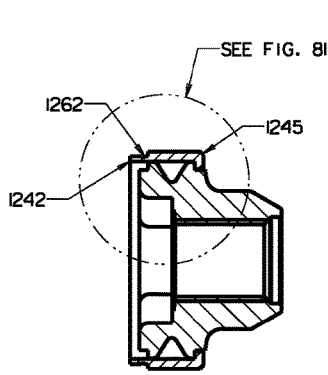
FIG. 80 is a pre-assembled longitudinal vertical sectional view of the security fastener shown in FIG. 77.

In the pre-assembled state shown in FIGS. 80 and 81, shroud 1220 has been placed over retaining portion 1219 such that leftwardly-facing surface 1232 of shroud 1220 abuts against rightwardly-facing annular end face 1227 of retaining portion 1219. Thus, right annular flange 1245 is seated in right annular step 1226 such that shroud 1220 is restrained from moving left along axis x-x relative to fastener body 1216. As shown, in this pre-assembled state, the left end 1242 of shroud 1220 extends leftwardly a distance beyond end face 1270 of retaining portion 1219. When assembled as described below, this extension will disappear as end portion 1242 of shroud 1220 bends and buckles inwardly into step 1225 and reduces the axial length along axis x-x of shroud 1220.

Figure 82:
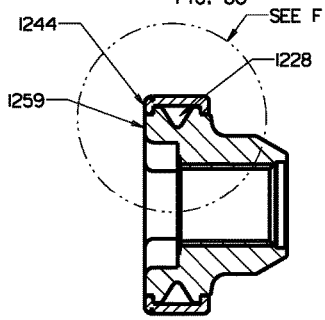
FIG. 82 is a fully-assembled longitudinal vertical sectional view of the security fastener shown in FIG. 77.
Figure 83:
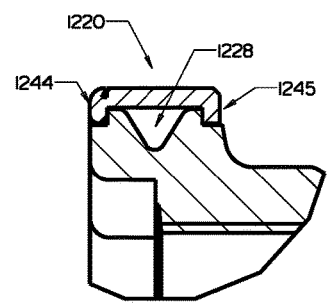
FIG. 83 is an enlarged detailed view of the security fastener shown in FIG. 82, taken generally within the indicated circle of FIG. 82.
Figure 84:
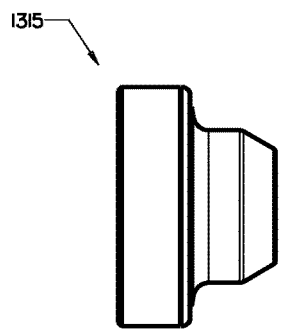
FIG. 84 is a side elevation view of an fourteenth embodiment of an improved security fastener.
Figure 85:
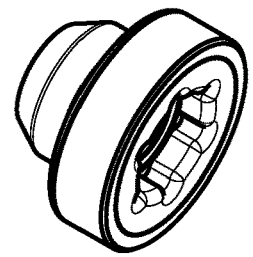
FIG. 85 is a perspective view of the security fastener shown in FIG. 84.
Figure 86:
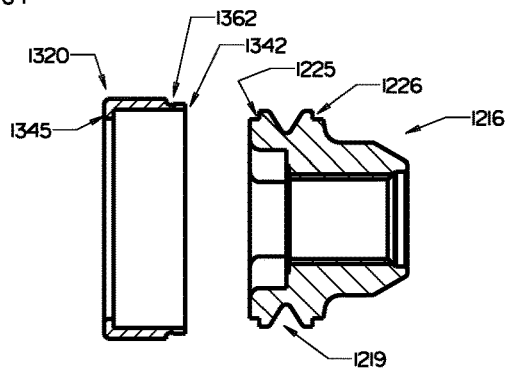
FIG. 86 is a pre-assembled exploded longitudinal vertical sectional view of the security fastener shown in FIG. 84.

To complete assembly of fastener 1215, with shroud 1220 placed over retaining portion 1219 such that leftwardly-facing surface 1232 of shroud 1220 abuts against rightwardly-facing annular end face 1227 of retaining portion 1219 and right annular flange 1245 is seated in right annular step 1226 as shown in FIGS. 80 and 81, an axial force is then applied with a ram to leftwardly-facing annular surface 1234 of shroud 1220 while right annular flange 1245 seated in right annular step 1226 are both held stationary in a press or the like. Such force is great enough to bend and buckle end portion 1242 at notch 1236 of shroud 1220 into step 1225 of retaining portion 1219 of fastener body 1216, as shown in FIGS. 82 and 82, which depict the fully assembled configuration of fastener 1215. Thus, thinned end portion 1242 of cylindrical shroud 1220 aligns axially with step 1225 of retaining portion 1219 and is not immediately supported and has thickness 1257. It is configured to buckle outwardly and bend inwardly into step 1225 at notch 1236 under the applied force to form axially-buckled radially-extending annular end portion 1244 bent inwardly transverse to central axis x-x and disposed in annular step 1225 of shroud-receiving body portion 1219. When assembled, annular bent portion 1244 is seated in annular step 1225, thereby retaining shroud 1220 on the end of body 1216 such that shroud 1220 is free to rotate about center axis x-x of body 1216 but is restrained from moving axially to the right off of retaining portion 1219 and body 1216. Thus, as shown in FIG. 83, axially-buckled radially-extending annular end portion 1244 is formed, which is bent inwardly transverse to central axis x-x and is disposed in annular step 1225 of shroud-receiving body portion 1219 of fastener body 1216.

Shroud 1220 is thereby mounted concentrically on retaining portion 1219 of nut fastener 1215 such that it does not move axially off of retaining portion 1219 but is substantially free to rotate about axis x-x relative to fastener body 1216.

Turning now to FIGS. 84-90, a nut-type security fastener 1315 according to a fourteenth example embodiment is shown. Fastener 1315 has most of the features of fastener 1215 described above in connection with FIGS. 77-83. The only difference between fastener 1215 and fastener 1215 lies in the fact that thinned portion 1342 is on the right annular end of shroud 1320 and annular flange 1345 is on the left annular end of shroud 1320.

Figure 87:
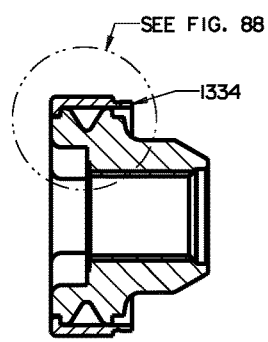
FIG. 87 is a pre-assembled longitudinal vertical sectional view of the security fastener shown in FIG. 84.
Figure 88:
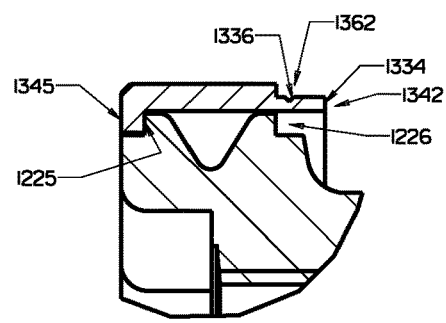
FIG. 88 is an enlarged detailed view of the security fastener shown in FIG. 87, taken generally within the indicated circle of FIG. 87.

In particular, in the pre-assembled state shown in FIGS. 87 and 88, shroud 1320 has been placed over retaining portion 1319 such that left annular flange 1345 is seated in left annular step 1225 such that shroud 1320 is restrained from moving right along axis x-x relative to fastener body 1216. As shown, in this pre-assembled state, the right end 1342 of shroud 1320 extends rightwardly a distance beyond the end of step 1226 of retaining portion 1219. When assembled as described below, this extension will disappear as end portion 1342 of shroud 1320 buckles and bends inwardly into step 1226 and reduces the axial length along axis x-x of shroud 1320.

Figure 89:
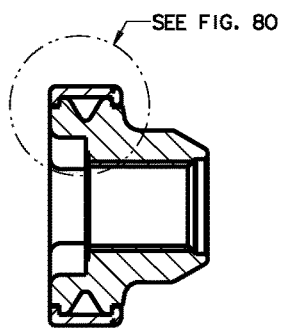
FIG. 89 is a fully-assembled longitudinal vertical sectional view of the security fastener shown in FIG. 84.
Figure 90:
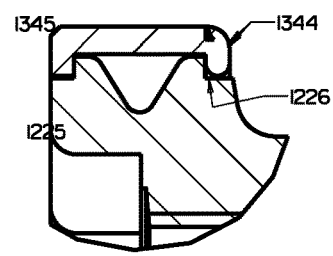
FIG. 90 is an enlarged detailed view of the security fastener shown in FIG. 89, taken generally within the indicated circle of FIG. 89.
Figure 91:
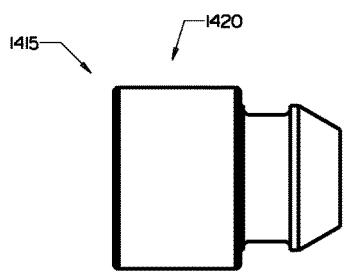
FIG. 91 is a side elevation view of an fifteenth embodiment of an improved security fastener.
Figure 92:
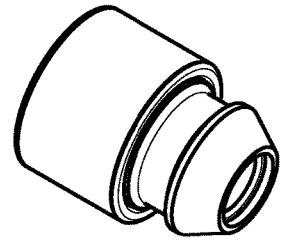
FIG. 92 is a perspective view of the security fastener shown in FIG. 91.
Figure 93:
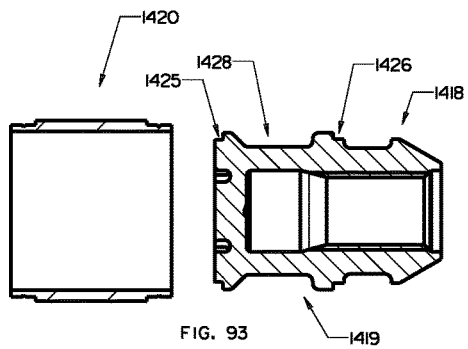
FIG. 93 is a pre-assembled exploded longitudinal vertical sectional view of the security fastener shown in FIG. 91.

To complete assembly of fastener 1315, with shroud 1320 placed over retaining portion 1219 such left annular flange 1345 is seated in left annular step 1225 as shown in FIGS. 87 and 88, an axial force is then applied with a ram to rightwardly-facing annular surface 1334 of shroud 1320 while left annular flange 1345 seated in left annular step 1225 are both held stationary in a press or the like. Such force is great enough to bend and buckle end portion 1342 at notch 1336 of shroud 1320 into step 1226 of retaining portion 1219 of fastener body 1216, as shown in FIGS. 89 and 90, which depict the fully assembled configuration of fastener 1315. Thus, thinned end portion 1342 of cylindrical shroud 1320 aligns axially with step 1226 of retaining portion 1219 and is not immediately supported and has thickness 1357. It is configured to buckle outwardly and bend inwardly into step 1226 at notch 1336 under the applied force to form axially-buckled radially-extending annular end portion 1344 bent inwardly transverse to central axis x-x and disposed in annular step 1225 of shroud-receiving body portion 1219. When assembled, annular bent portion 1344 is seated in annular step 1226, thereby retaining shroud 1320 on the end of body 1216 such that shroud 1320 is free to rotate about center axis x-x of body 1216 but is restrained from moving axially to the left off of retaining portion 1219 and body 1216. Thus, as shown in FIG. 90, axially-buckled radially-extending annular end portion 1344 is formed, which is bent inwardly transverse to central axis x-x and is disposed in annular step 1226 of shroud-receiving body portion 1219 of fastener body 1216.

Shroud 1320 is thereby mounted concentrically on retaining portion 1219 of nut fastener 1215 such that it does not move axially off of retaining portion 1219 but is substantially free to rotate about axis x-x relative to fastener body 1216.

Turning now to FIGS. 91-97, a nut-type security fastener 1415 according to a fifteenth example embodiment is shown. Fastener 1415 has many of the features of fastener 1215 described above in connection with FIGS. 77-83. The biggest difference between fastener 1415 and fastener 1215 lies in the fact that both annular ends of shroud 1420 have thinned portions 1442 and 1445.

Figure 94:
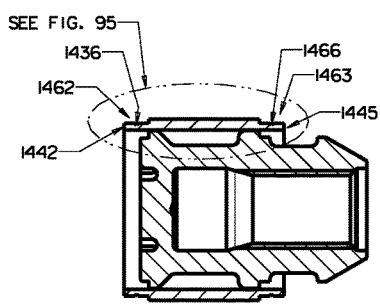
FIG. 94 is a pre-assembled longitudinal vertical sectional view of the security fastener shown in FIG. 91.
Figure 95:
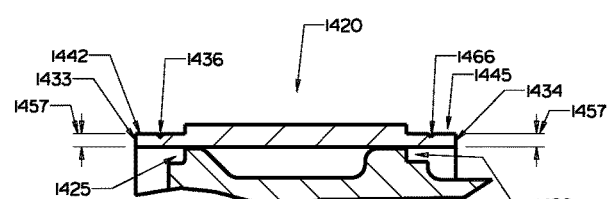
FIG. 95 is an enlarged detailed view of the security fastener shown in FIG. 94, taken generally within the indicated circle of FIG. 94.

In particular, in the pre-assembled state shown in FIGS. 94 and 95, shroud 1420 has been placed over retaining portion 1419 such that left thinned annular end 1442 of shroud 1420 is aligned axially with left annular step 1425 of retaining portion 1419 of body 1416 and right thinned annular end 1445 of shroud 1420 is aligned axially with right annular step 1425 of retaining portion 1419 of body 1416, such that the left end 1442 of shroud 1420 extends leftwardly a distance beyond the end of step 1425 of retaining portion 1519 and the right end 1445 of shroud 1420 extends rightwardly a distance beyond the end of step 1426 of retaining portion 1419. When assembled as described below, these extensions will disappear as end portion 1442 of shroud 1420 buckles and bends inwardly into step 1425 and end portion 1445 of shroud 1420 buckles and bends inwardly into step 1426, reducing the axial length along axis x-x of shroud 1420.

Figure 96:
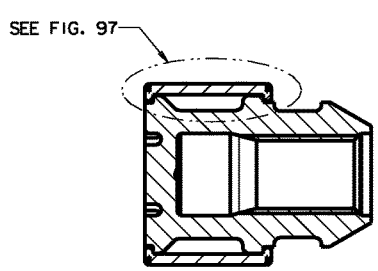
FIG. 96 is a fully-assembled longitudinal vertical sectional view of the security fastener shown in FIG. 91.
Figure 97:
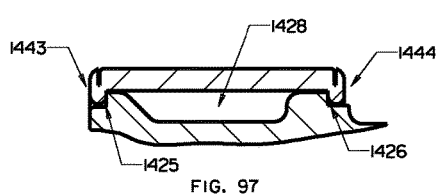
FIG. 97 is an enlarged detailed view of the security fastener shown in FIG. 96, taken generally within the indicated circle of FIG. 96.

To complete assembly of fastener 1415, with shroud 1420 placed over retaining portion 1419 as shown in FIGS. 94 and 95, opposed axial forces are then applied with opposed rams simultaneously to rightwardly-facing annular surface 1434 of shroud 1320 and leftwardly-facing annular surface 1333 of shroud 1320. Such forces are great enough to buckle and bend end portion 1442 at notch 1436 of shroud 1420 into step 1425 of retaining portion 1419 of fastener body 1416 and buckle and bend end portion 1445 at notch 1466 of shroud 1420 into step 1426 of retaining portion 1419 of fastener body 1416, as shown in FIGS. 96 and 97, which depict the fully assembled configuration of fastener 1415. Thus, thinned end portion 1442 of cylindrical shroud 1420 aligns axially with step 1425 of retaining portion 1419 and is not immediately supported and has thickness 1457 and thinned end portion 1445 of cylindrical shroud 1420 aligns axially with step 1426 of retaining portion 1419 and is not immediately supported and has thickness 1457. These annular ends are configured to buckle and bend or curl inwardly into steps 1425 and 1426, respectively, at notches 1436 and 1466, respectively, under the applied force to form axially-buckled radially-extending annular end portions 1443 bent inwardly transverse to central axis x-x and disposed in annular step 1425 of shroud-receiving body portion 1419 and axially-buckled radially-extending annular end portions 1444 bent inwardly transverse to central axis x-x and disposed in annular step 1426 of shroud-receiving body portion 1419. When assembled, annular bent portion 1443 is seated in annular step 1425, thereby retaining shroud 1420 on body 1416 such that shroud 1420 is free to rotate about center axis x-x of body 1416 but is restrained from moving axially to the right off of retaining portion 1419 and body 1416 and annular bent portion 1444 is seated in annular step 1426, thereby retaining shroud 1420 on body 1416 such that shroud 1420 is free to rotate about center axis x-x of body 1416 but is restrained from moving axially to the left off of retaining portion 1419 and body 1416. Thus, as shown in FIG. 97, axially-buckled radially-extending annular end portion 1443 is formed, which is bent inwardly transverse to central axis x-x and is disposed in annular step 1425 of shroud-receiving body portion 1419 of fastener body 1416, and axially-buckled radially-extending annular end portion 1443 is formed, which is bent inwardly transverse to central axis x-x and is disposed in annular step 1426 of shroud-receiving body portion 1419 of fastener body 1416.

Shroud 1420 is thereby mounted concentrically on retaining portion 1419 of nut fastener 1415 such that it does not move axially off of retaining portion 1419 but is substantially free to rotate about axis x-x relative to fastener body 1416.

The components of the embodiments of the fastener may be formed of various different materials. For example, and without limitation, steel, stainless steel, brass, aluminum and titanium may be used. As another alternative, and without limitation, non-metallic materials may be used in some applications. In some applications, and without limitation, the cap or shroud may be of a material harder than the lock body. For example, and without limitation, the spin cap or shroud may have a hardness range from about 36 Rockwell C to 55 Rockwell C and the lock body may have a hardness less than the hardness of the spin cap. The hardness of the spin cap may be less than about 40 Rockwell C. Without limitation, in certain applications the volume of material deformed and moved to fill the corresponding annular groove may be about 30% or higher.

In addition, the fastener may be designed using certain boundary conditions shown below. The first constraint governs, with reference to the first embodiment 15 as an example and without limitation, the inside diameter 54 of post 19. The second constraint governs the strength of the buckle zone (buckle 43 formed from medial portion 41) of post 19 relative to the non-buckle zone (distal end portion 42 and proximate portion 45) of post 19. The third constraint governs the tube slenderness ratio of the post.

VARIABLE DEFINITIONS l=axial length of groove (23)
$D_1$=outside diameter of crush post (19) (reference 55 in FIG. 4)
$D_2$=inside diameter of crush post (19) (reference 54 in FIG. 4)
H=difference in height of post pre/post assembly (reference 51 in FIG. 4)
k=relationship factor ratio between allowable tensile and sheer stresses
T=input torque required for lock
F=resulting force needed to torque lock
RT=resulting offload torque (what the post has to support)
$LH_t$=length of L-handle from center of rotation to force application
$LH_d$=length of L-handle from center of axial traverse rotation to force application
$\sigma_{RT,post}$=resulting stress in post from off axis torque during lock installation
TA=tensile stress in post
SA=shear stress in buckled region of post
Initial Problem Definition—Relationships $$\sigma_{TA,max} \equiv \sigma_{ult}$$

$$k \rightarrow \text{relation factor} = \frac{\text{ultimate tensile}}{\text{ultimate shear}} = (0.5, 0.8)$$

Solving for Constraint 1

$$T = F*LH_l \Rightarrow F = \frac{T}{LH_l} \tag{1}$$

-continued $$RT = F * LH_d$$

$$\sigma_{RT,post} = \frac{32 * RT * D_1}{\pi * (D_1^4 - D_2^4)} \text{ from}$$

$$(1) \quad D_2 = \left(D_1^4 - \frac{32 * RT * D_1}{\sigma_{RT,post} * \pi * (D_1^4 - D_2^4)}\right)^{1/4}$$

Solving for Constraint 2

$$TA = \frac{\pi}{4}(D_1^2 - D_2^2) * h$$

$$SA = \pi * l * D_1 * h * k$$

set $SA \geq TA$ $$\frac{\pi}{4}(D_1^2 - D_2^2) * h \geq \pi * l * D_1 * h * k$$

Reduces to $$\frac{1}{4}(D_1^2 - D_2^2) \geq l * D_1 * k$$

$$D_2 \geq \sqrt{D_1^2 - 4 * l * D_1 * k}$$

Reduces to $$D_2 \geq \sqrt{D_1 * (D_1 - 4 * l * k)}$$

Constraint 3 (assumed)

$$D_2 \leq 0.95 * D_1$$

The present invention contemplates that many changes and modifications may be made. Therefore, while forms of the improved fastener have been shown and described, and a number of alternatives discussed, persons skilled in this art will readily appreciate that various additional changes and modifications may be made without departing from the scope of the invention, as defined and differentiated by the following claims.

What is claimed is:

1. A fastener comprising:
a fastener body orientated about a central axis;
said fastener body having a tool-engaging portion to which a driving torque may be applied and a threaded fastening portion configured and arranged to mate with a corresponding threaded element;
said fastener body having a shroud-receiving body portion orientated about said central axis;
a shroud concentrically mounted on said shroud-receiving body portion and having an inner surface facing an outer surface of said shroud-receiving body portion;
said shroud being supported in rotatable relationship with said shroud-receiving body portion such that said shroud will rotate relative to said fastener body under an applied external torque prior to said fastener body rotating when said fastener body is engaged with an external structure at a design installation torque;
said inner surface of said shroud comprising an annular groove orientated transverse to said central axis;
said shroud-receiving body portion comprising a substantially arch-shaped axially-buckled radially-extending annular protrusion extending outwardly transverse to said central axis and having at least an annular apex disposed in said annular groove of said shroud; and
said substantially arch-shaped axially-buckled radially-extending annular protrusion of said shroud-receiving body portion and said annular groove of said shroud forming a shroud-retaining element restraining said shroud from movement in at least a first axial direction along said central axis.

2. The fastener of claim 1, wherein:
said shroud-receiving body portion comprises a thin-walled cylindrical tubular portion having an annular first body surface, and an annular shoulder having an annular second body surface;
said shroud comprises an annular shoulder portion having an annular first shroud surface, and an annular second shroud surface; and
said first body surface faces said first shroud surface and said second body surface faces said second shroud surface.

3. The fastener set forth in claim 2, wherein said second body surface of said shroud-receiving body portion and said second shroud surface of said shroud are in an opposing orientation and form a second shroud-retaining element restraining said shroud from movement in at least a second axial direction along said central axis opposite to said first axial direction along said central axis.

4. The fastener set forth in claim 3, wherein an end portion of said thin-walled cylindrical tubular portion of said shroud-receiving body portion that is adjacent said annular first body surface of said shroud-receiving body portion is supported radially by an opposed inwardly-facing cylindrical surface of said shroud such that said end portion of said thin-walled cylindrical tubular portion of said shroud-receiving body portion is restrained from deforming radially outwardly from said central axis by said opposed inwardly-facing cylindrical surface of said shroud.

5. The fastener set forth in claim 4, wherein said annular groove of said shroud extends into a medial portion of said inner surface of said shroud between said first shroud surface and said second shroud surface.

6. The fastener set forth in claim 5, wherein said shroud-retaining element is formed by an axial buckle of a medial portion of said thin-walled cylindrical tubular portion of said shroud-receiving body portion radially into said annular groove of said shroud.

7. The fastener set forth in claim 6, wherein said axial buckle of said medial portion of said thin-walled cylindrical tubular portion of said shroud-receiving body portion is formed by a compressive force applied axially to said thin-walled cylindrical tubular portion of said shroud-receiving body portion by said first shroud surface of said shroud.

8. The fastener set forth in claim 1, wherein said groove of said shroud comprises an annular first inner corner, an annular second inner corner, an annular first outer edge with said inner surface of said shroud, and an annular second outer edge with said inner surface of said shroud.

9. The fastener set forth in claim 8, wherein said annular first inner corner and/or said annular second inner corner of said groove comprises a frusto-conical surface or a radial surface.

10. The fastener set forth in claim 8, wherein said annular first outer edge and/or said annular second outer edge of said groove comprises a frusto-conical surface or a radial surface.

11. The fastener set forth in claim 1, wherein said annular groove of said shroud comprises a trapezoidal, triangular or semi-circular cross-section taken in a plane extending radially from said central axis.

12. The fastener set forth in claim 1, wherein said groove of said shroud is substantially U-shaped or V-shaped.

13. The fastener set forth in claim 1, wherein said substantially arch-shaped axially-buckled radially-extending annular protrusion of said shroud-receiving body portion is asymmetrical.

14. The fastener set forth in claim 1, wherein said substantially arch-shaped axially-buckled radially-extending annular protrusion of said shroud-receiving body portion is substantially U-shaped or V-shaped.

15. The fastener set forth in claim 1, wherein said fastener body comprises a lock nut or a lock bolt.

16. A fastener comprising:
a fastener body orientated about a central axis;
said fastener body having a tool-engaging portion to which a driving torque may be applied and a threaded fastening portion configured and arranged to mate with a corresponding threaded element;
said fastener body having a shroud-receiving body portion orientated about said central axis;
a shroud concentrically mounted on said shroud-receiving body portion and having an inner surface facing an outer surface of said shroud-receiving body portion;
said shroud being supported in rotatable relationship with said shroud-receiving body portion such that said shroud will rotate relative to said fastener body under an applied external torque prior to said fastener body rotating when said fastener body is engaged with an external structure at a design installation torque;
said outer surface of said shroud-receiving body portion comprising an annular groove orientated transverse to said central axis;
said shroud comprising a substantially arch-shaped axially-buckled radially-extending annular protrusion extending inwardly transverse to said central axis and having at least an annular apex disposed in said annular groove of said shroud-receiving body portion; and
said substantially arch-shaped axially-buckled radially-extending annular protrusion of said shroud and said annular groove of said shroud-receiving body portion forming a shroud-retaining element restraining said shroud from movement in at least a first axial direction along said central axis.

17. The fastener of claim 16, wherein:
said shroud-receiving body portion comprises an annular shoulder having an annular body surface;
said shroud comprises an annular first shroud surface and an annular second shroud surface;
and said first shroud surface faces said body surface.

18. The fastener set forth in claim 17, wherein said body surface of said shroud-receiving body portion and said first shroud surface of said shroud are in an opposing orientation and form a second shroud-retaining element restraining said shroud from movement in at least a second axial direction along said central axis opposite to said first axial direction along said central axis.

19. The fastener set forth in claim 17, wherein an end portion of said shroud that is adjacent said first shroud surface of said shroud is supported radially by an opposed outwardly-facing cylindrical surface of said shroud-receiving body portion such that said end portion of said shroud is restrained from deforming radially inwardly toward said central axis by said opposed outwardly-facing cylindrical surface of said shroud-receiving body portion.

20. The fastener set forth in claim 17, wherein said shroud-receiving body portion comprises an annular second body end surface and said annular groove of said shroud-receiving body portion extends into a medial portion of said outer surface of said shroud-receiving body portion between said body surface and said second body surface.

21. The fastener set forth in claim 20, wherein said shroud-retaining element is formed by an axial buckle of a medial portion of said shroud radially into said annular groove of said shroud-receiving body portion.

22. The fastener set forth in claim 21, wherein said axial buckle of said medial portion of said shroud is formed by a compressive force applied axially to said annular second shroud surface of said shroud.

23. The fastener set forth in claim 16, wherein said shroud comprises a thinned tubular cylindrical portion axially aligned with said annular groove of said shroud-receiving body portion and said shroud-retaining element is formed by an axial buckle of said thinned tubular cylindrical portion of said shroud radially into said annular groove of said shroud-receiving body portion.

24. The fastener set forth in claim 23, wherein said thinned tubular cylindrical portion of said shroud comprises an annular crease and said annular apex of said shroud-retaining element is formed by an axial buckle of said thinned tubular cylindrical portion of said shroud at said annular crease radially into said annular groove of said shroud-receiving body portion.

25. The fastener set forth in claim 16, wherein said groove of said shroud-receiving body portion comprises an annular first inner corner, an annular second inner corner, an annular first outer edge with said outer surface of said shroud-receiving body portion, and an annular second outer edge with said outer surface of said shroud-receiving body portion.

26. The fastener set forth in claim 25, wherein said annular first inner corner and/or said annular second inner corner of said groove comprises a frusto-conical surface or a radial surface.

27. The fastener set forth in claim 25, wherein said annular first outer edge and/or said annular second outer edge of said groove comprises a frusto-conical surface or a radial surface.

28. The fastener set forth in claim 16, wherein said annular groove of said shroud-receiving body portion comprises a trapezoidal, triangular or semi-circular cross-section taken in a plane extending radially from said central axis.

29. The fastener set forth in claim 16, wherein said groove of said shroud-receiving body portion is substantially U-shaped or V-shaped.

30. The fastener set forth in claim 16, wherein said substantially arch-shaped axially-buckled radially-extending annular protrusion of said shroud is asymmetrical.

31. The fastener set forth in claim 16, wherein said substantially arch-shaped axially-buckled radially-extending annular protrusion of said shroud is substantially U-shaped or V-shaped.

32. The fastener set forth in claim 16, wherein said fastener body comprises a lock nut or a lock bolt.

33. A fastener comprising:
a fastener body orientated about a central axis;
said fastener body having a tool-engaging portion to which a driving torque may be applied and a threaded fastening portion configured and arranged to mate with a corresponding threaded element;
said fastener body having a shroud-receiving body portion orientated about said central axis;
a shroud concentrically mounted on said shroud-receiving body portion and having an inner surface facing an outer surface of said shroud-receiving body portion;

said shroud being supported in rotatable relationship with said shroud-receiving body portion such that said shroud will rotate relative to said fastener body under an applied external torque prior to said fastener body rotating when said fastener body is engaged with an external structure at a design installation torque;

said outer surface of said shroud-receiving body portion comprising an annular step orientated transverse to said central axis;

said shroud comprising an axially-buckled radially-extending annular end portion bent inwardly transverse to said central axis and disposed in said annular step of said shroud receiving body portion; and said bent end portion of said shroud and said annular step of said shroud-receiving body portion forming a shroud-retaining element restraining said shroud from movement in at least a first axial direction along said central axis.

34. The fastener of claim 33, wherein:
said shroud-receiving body portion comprises a second annular step;
said shroud comprises an annular flange disposed around said annular step of said shroud-receiving body portion; and
said second annular step of said shroud-receiving body portion and said annular flange of said shroud form a second shroud-retaining element restraining said shroud from movement in at least a second axial direction along said central axis opposite to said first axial direction along said central axis.

35. The fastener set forth in claim 33, wherein said shroud comprises a thinned tubular cylindrical portion axially aligned with said annular step of said shroud-receiving body portion and said shroud-retaining element is formed by an axial buckle of said thinned tubular cylindrical portion of said shroud radially around said annular step of said shroud-receiving body portion.

36. The fastener set forth in claim 35, wherein said thinned tubular cylindrical portion of said shroud comprises an annular crease and said shroud-retaining element is formed by an axial buckle of said thinned tubular cylindrical portion of said shroud at said annular crease.

37. The fastener of claim 33, wherein said shroud-receiving body portion comprises a second annular step and said outer surface of said shroud-receiving body portion comprises an annular notch or recess between said annular step and said second annular step.

38. The fastener of claim 33, wherein:
said outer surface of said shroud-receiving body portion comprises a second annular step orientated transverse to said central axis;
said shroud comprises a second axially-buckled radially-extending annular end portion bent inwardly transverse to said central axis and disposed around said second annular step of said shroud-receiving body portion; and
said second bent end portion of said shroud and said second annular step of said shroud-receiving body portion form a second shroud-retaining element restraining said shroud from movement in at least a second axial direction along said central axis opposite to said first axial direction along said central axis.

39. The fastener of claim 38, wherein said shroud comprises a thinned tubular cylindrical portion axially aligned with said second annular step of said shroud-receiving body portion and said second shroud-retaining element is formed by an axial buckle of said thinned tubular cylindrical portion of said shroud radially around said second annular step of said shroud-receiving body portion.

40. The fastener set forth in claim 39, wherein said thinned tubular cylindrical portion of said shroud comprises an annular crease and said second shroud-retaining element is formed by an axial buckle of said thinned tubular cylindrical portion of said shroud at said annular crease.

41. The fastener set forth in claim 33, wherein said fastener body comprises a lock nut or a lock bolt.

* * * * *